(12) United States Patent
Sleevi

(10) Patent No.: US 10,938,725 B2
(45) Date of Patent: Mar. 2, 2021

(54) LOAD BALANCING MULTIMEDIA CONFERENCING SYSTEM, DEVICE, AND METHODS

(71) Applicant: Farm & Home Cooperative, Platte City, MO (US)

(72) Inventor: Neil Sleevi, Platte City, MO (US)

(73) Assignee: Farm & Home Cooperative, Platte City, MO (US)

(*) Notice: Subject to any disclaimer, the term of this patent is extended or adjusted under 35 U.S.C. 154(b) by 57 days.

(21) Appl. No.: 16/583,731

(22) Filed: Sep. 26, 2019

(65) Prior Publication Data

US 2020/0106708 A1    Apr. 2, 2020

Related U.S. Application Data

(60) Provisional application No. 62/742,511, filed on Oct. 8, 2018, provisional application No. 62/737,410, filed on Sep. 27, 2018.

(51) Int. Cl.
*H04L 12/26* (2006.01)
*H04L 12/803* (2013.01)
*H04L 29/06* (2006.01)

(52) U.S. Cl.
CPC .......... *H04L 47/125* (2013.01); *H04L 63/08* (2013.01); *H04L 65/4053* (2013.01)

(58) Field of Classification Search
None
See application file for complete search history.

(56) References Cited

U.S. PATENT DOCUMENTS 9,473,780 B2    10/2016 Nelson et al.
2007/0220049 A1*  9/2007 Hwang ............... G11B 27/034
(Continued)

OTHER PUBLICATIONS

NPL_CITE_1: Cisco Press; 1 edition. By Steve Fry, Thiya Ramalingam, Scott Firestone. Voice and Video Conferencing Fundamentals, Chapter 7: Lip synchronization in Video Conferencing. pp. 223-255. Publication Date: Mar. 16, 2007 (https://www.amazon.com/Voice-Video-Conferencing-Fundamentals-Firestone-ebook/dp/B00132S6ZU).

(Continued)

*Primary Examiner* — Phuongchau Ba Nguyen
(74) *Attorney, Agent, or Firm* — Patentfile, LLC; Bradley C. Fach; Steven R. Kick

(57) ABSTRACT

A computer implemented load balancing multimedia conferencing method may be used to reduce processing time required for secure 2D and/or 3D multimedia network communications, and may include the steps of: enabling communication of multimedia content, having audio data that is associated with video frame data, between a sending end-point and a receiving end-point, the receiving end-point having a receiving multimedia content index; determining a load-balancing procedure that divides a video frame of the multimedia content into a first video frame portion and a second video frame portion, the first and second video frame portions associated with audio data; providing the second video frame portion and associated audio data to the receiving end-point; deriving, via the receiving end-point, a third video frame portion using the receiving multimedia content index; and combining, via the receiving end-point, the second video frame portion and derived third video frame portion into a composite video frame.

20 Claims, 8 Drawing Sheets

(56) References Cited

U.S. PATENT DOCUMENTS

2012/0096007 A1* 4/2012 Thambiratnam ...... G11B 27/28
   707/741
2016/0105641 A1   4/2016 Periyannan et al.

OTHER PUBLICATIONS

NPL_CITE_2: Nazeeh Shuja Alothmany, Classification of Visemes Using Visual Cues, relevant pp. 1-142, Apr. 17, 2009, University of Pittsburgh.

* cited by examiner

LOAD BALANCING MULTIMEDIA CONFERENCING SYSTEM, DEVICE, AND METHODS

CROSS REFERENCE TO RELATED APPLICATIONS

This application claims priority to and the benefit of the filing date of U.S. Provisional Application No. 62/737,410, filed on Sep. 27, 2018, entitled "Collaborative Load-Balancing for Constrained Bandwidth Videoconferencing", and U.S. Provisional Application No. 62/742,511, filed on Oct. 8, 2018, entitled "Rural Broadband Emulation" which are hereby incorporated by reference in their entirety.

FIELD OF THE INVENTION

The present invention relates to conference systems and more specifically various methods and systems for using load balancing of conference resources in constrained bandwidth situations by reducing end-to-end communication network throughput requirements, and enhancing conferencing activities by improving multimedia content processing, including delivery quality and security.

BACKGROUND

Three conferencing capabilities which could benefit many rural areas are telehealth delivery, telework (e.g. work-at-home on-line employees) and distance education. Unfortunately, bandwidth is constrained in many rural areas due to the high costs to serve sparsely populated rural areas which greatly impairs the adoption of telecommunications transmission capabilities required for these three key services. Insufficient bandwidth in rural areas adversely affects delivery of these services and is a key factor in their diminished acceptance. Networks having insufficient bandwidth may benefit from using otherwise wasted idle time in telecom networks to make use of that time for other purposes as disclosed in U.S. Pat. No. 4,811,382, entitled "Method and apparatus for applying messages in a telecommunications network" granted to Neil F. Sleevi. Disadvantaged and underserved areas are especially affected by the lack of capability and capacity needed and the high costs of today's multimedia delivery. Improving conferencing capabilities in constrained bandwidth situations can improve quality of life for many rural users, including for example, delivery of in-home health care for aging, disabled and veterans; remote work-at-home on-line jobs for underemployed and unemployed rural workers and distance education for homebound students.

Bandwidth constraints due to the high cost of telecommunications equipment and/or infrastructure to support sparsely populated rural areas greatly impairs the adoption of three key multimedia services: telehealth (including telemedicine), remote work-at-home "telework" and in-home distance education. Insufficient bandwidth in rural areas adversely affects delivery of these services and their acceptance can be greatly diminished. This problem impacts quality of life in rural areas. Meanwhile end-user device-related storage capacity, processing capabilities, security technologies and affordability have improved so much in past few years that it is now feasible that more secure storage and processing can be done at lower costs than ever before at the end-point multimedia terminal end-point device-level by using Load Balancing Multimedia Conferencing System (LBMCS) to offset bandwidth cost constraints.

The ability to generate high quality video from audio significantly reduce the amount of bandwidth needed in multimedia conferencing (video transmission makes up a large percentage of current internet bandwidth and is especially difficult in low-bit rate bandwidth situations such as rural areas that are underserved or unserved by fixed broadband Internet).

Multimedia video images are often delivered to an end-user system through a transmission network or other delivery mechanism. Such content normally has audio, video and data components, with the audio portions of the content delivered to and output by an audio player (e.g., a speaker system, etc.) video portions of the content delivered to and output by a video display (e.g., a television, smart phone, computer monitor, etc.) and data components to and output by a data device such as a computing device. Such content can be arranged in a number of ways, including in the form of streamed content in which separate packets, or frames, of video, audio, and data are respectively provided to the output devices. However, due to a number of factors including processor delays, network and system-based delays, the audio and video portions of the content often become out of synchronization (sync). The overall delay, also referred to as latency, can be divided into three main components: encoding delay, network delay, and decoding delay. In real-time interactive applications, the user will notice some objectionable delay if the round trip time exceeds 250 milliseconds. The processing delay at both the encoder and decoder represents a significant component of the overall delay, with the encoder delay being at least twice as much as the decoder delay. In order to maintain a minimal latency, it is therefore important to maintain a very small processing delay. Low processing delay real-time video conferencing applications involve the processing and transmission of mostly timely information, represented by the audio, video and other session-related data. Given that participants are in a constant exchange of audio and video information, it is very important that the delay associated with the processing and transmission of the data be kept to a minimum, while also maintaining at least acceptable quality. This may cause the end user to notice that the lips of a speaker's face in a video track do not align with the words in the corresponding audio track. This is called the lip sync problem and is mitigated most commonly by intentionally delaying (e.g. audio skewing) the received audio signal at the receiving end-point until video data is processed and the receiving end-point video data is then aligned with the receiving end-point audio signal, to synchronize multimedia output.

Therefore, there exists a need for novel conference systems and more specifically various methods and systems for using load balancing of conference resources in constrained bandwidth situations by reducing end-to-end communication network throughput requirements, and enhancing conferencing activities by improving multimedia content processing, including delivery quality and security.

BRIEF SUMMARY OF THE INVENTION

A load balancing multimedia conferencing system and methods are described herein which provide one or more of the following advantages. Preferably, the system and methods may use identically stored data content at the sending end-point (transmitting) and receiving end-point and which takes advantage of otherwise wasted audio receiving end-point skewing time to reduce processing time required for secure 2D and/or 3D multimedia network communications systems, and eliminates significant inter-system system processing tasks. Most importantly, the load balancing multimedia conferencing system can significantly reduce the amount of real-time data streaming normally required between systems which will allow rural customers with low-bit rate connections to take advantage of otherwise economically and/or technically infeasible broadband-based multimedia conferencing services which can instead be provided over significantly lower-speed networks.

The system and methods allow multimedia conferencing sessions to appear life-like in bandwidth-constrained situations. The system and methods also allow multimedia communications transmission and receipt in bandwidth-constrained situations. Preferably, the system may include identical index libraries which may be used at both the sending end-point and receiving end-point, and some processing tasks typically done at the sending end-point may be done instead by the system at the receiving end-point in order to save valuable time. In this manner, the system and one or more end-points may make better use of otherwise wasted communications and processing resources and save time by allowing the receiving end-point to assist the transmitting end-point with tasks that are normally sending end-point tasks. This time savings can then be exploited to adapt multimedia session and system variables to improve conferencing experience for participants in constrained bandwidth situations.

According to one embodiment consistent with the principles of the invention, a computer implemented load balancing multimedia conferencing method is provided. In some embodiments, the method may include the steps of: enabling communication of multimedia content, having audio data that is associated with video frame data, between a sending end-point and a receiving end-point, the receiving end-point having a receiving multimedia content index; determining a load-balancing procedure that divides a video frame of the multimedia content into a first video frame portion and a second video frame portion, the first and second video frame portions associated with audio data; providing the second video frame portion and associated audio data to the receiving end-point; deriving, via the receiving end-point, a third video frame portion using the receiving multimedia content index; and combining, via the receiving end-point, the second video frame portion and derived third video frame portion into a composite video frame.

According to further embodiments consistent with the principles of the invention, a computer implemented load balancing multimedia conferencing method may include the steps of: enabling communication of multimedia content, having audio data that is associated with video frame data, between a sending end-point and a receiving end-point, wherein the sending end-point comprises a sending index library of sending multimedia content indexes, wherein the receiving end-point comprises a receiving index library of receiving multimedia content indexes, and wherein the sending multimedia content indexes and receiving multimedia content indexes are identical; determining a load-balancing procedure that divides a video frame of the multimedia content into a first video frame portion and a second video frame portion, the first video frame portion associated with audio data; providing the second video frame portion and associated audio data to the receiving end-point; monitoring resource and performance status to identify an audio skew period in the multimedia content at the receiving end-point; deriving, via the receiving end-point, a third video frame portion using the receiving multimedia content index during the audio skew period; and combining, via the receiving end-point, the second video frame portion and derived third video frame portion into a composite video frame.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
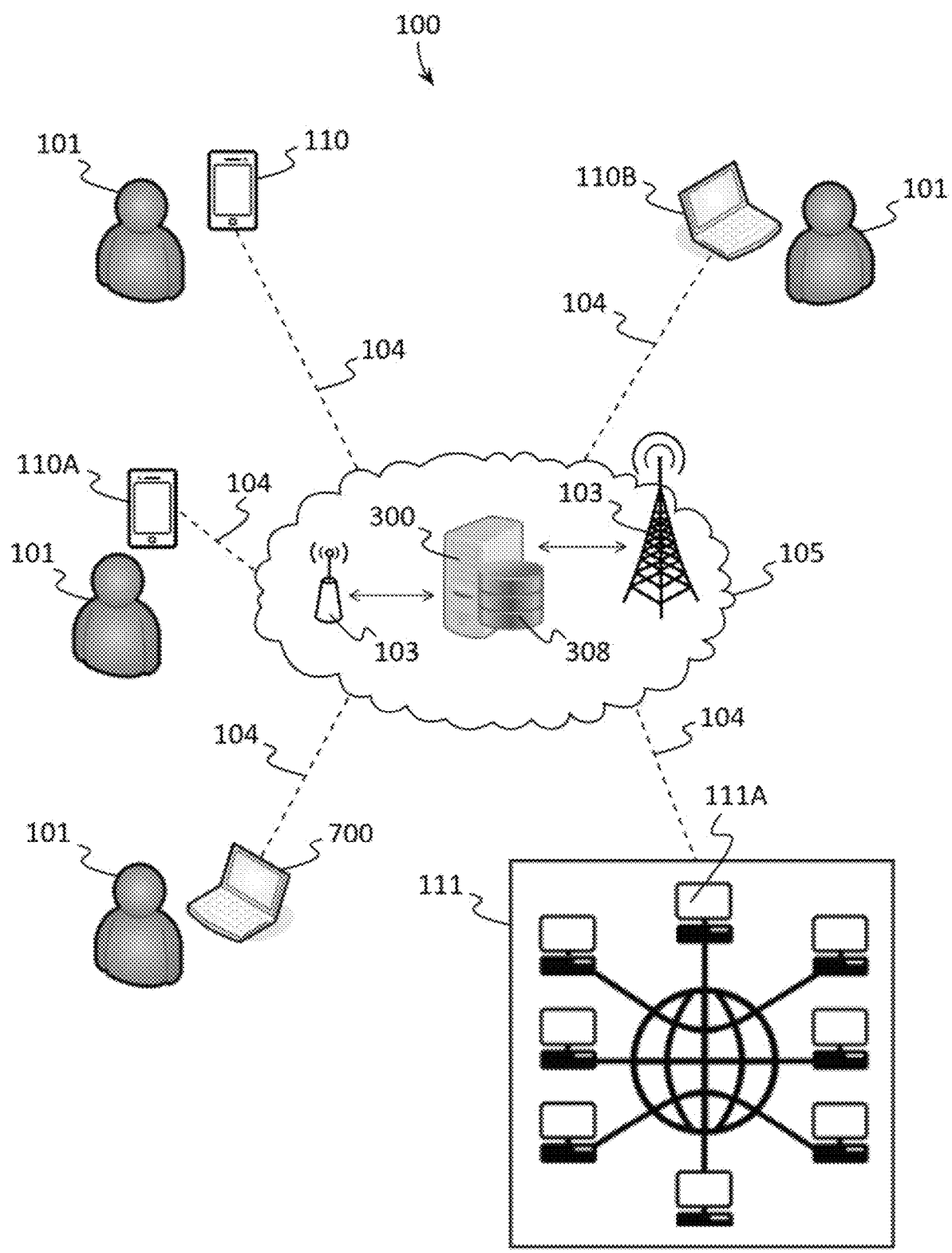
FIG. 1 depicts an illustrative example of some of the components and computer implemented methods which may be found in a Load Balancing Multimedia Conferencing System according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code", "source code", "script", or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "electronic device" as used herein is a type of computer comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, servers, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "client device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of client devices include: personal computers (PCs), workstations, servers, laptops, tablet PCs including the iPad, cell phones including iOS phones made by Apple Inc., Android OS phones, Microsoft OS phones, Blackberry phones, Apple iPads, Anota digital pens, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, tablets, digital pens, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, a Zigbee network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

As used herein, the term "blockchain" shall generally mean a distributed database that maintains a continuously growing ledger or list of records, called blocks, secured from tampering and revision using hashes. Every time data may be published to a blockchain database the data may be published as a new block. Each block may include a timestamp and a link to a previous block. Through the use of a peer-to-peer network and a distributed timestamping server, a blockchain database is managed autonomously. Blockchains are an open, distributed ledger that can record transactions between two parties efficiently and in a verifiable and permanent way. Consensus ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction input results in a different hash value being computed, which indicates potentially compromised transaction input. Digital signatures ensure that transactions originated from senders (signed with private keys) and not imposters. This covers different approaches to the processing including hash trees and hash graphs. At its core, a blockchain system records the chronological order of transactions with all nodes agreeing to the validity of transactions using the chosen consensus model. The result is transactions that are irreversible and agreed to by all members in the network.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods for multimedia conferencing are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a load balancing multimedia conferencing system ("the system") 100 according to some embodiments is presented. The system 100 is configured to facilitate the transfer of data and information between one or more access points 103, load balancing multimedia conferencing configured client devices ("LBMC client devices") 700, and servers 300 over a data network 105. One or more of LBMC client devices 700 may send data to and receive data from the data network 105 through a network connection 104 with an access point 103. A data store 308 accessible by the server 300 may contain one or more databases.

In this example, the system 100 comprises at least one (but preferably more than two) LBMC client devices 700 configured to be operated by one or more users 101. LBMC client devices 700 can be electronic devices, such as laptops, tablet computers, personal digital assistants, smart phones, such as Android phones and iPhone, and the like, that are equipped with a wireless network interface capable of sending data to one or more servers 300 with access to one or more data stores 308 over a network 105 such as a wireless local area network (WLAN). Additionally, LBMC client devices 700 can be fixed devices, such as desktops, workstations, and the like, that are equipped with a wireless or wired network interface capable of sending data to one or more servers 300 with access to one or more data stores 308 over a wireless or wired local area network 105. In further embodiments, an LBMC client device 700 may be configured as or may comprise cloud-based or hardware, software bridge, Multipoint control unit (MCU), or the like, which may be used to connect multiple sending 110A and receiving 110B end points but can also act as an end-point 110 itself. The present invention may be implemented on at least two LBMC client devices 700 programmed to perform one or more of the steps described herein. In some embodiments, more than one LBMC client devices 700 and servers 300 may be used, with each being programmed to carry out one or more steps of a method or process described herein.

The system 100 may be configured to enable video conferencing and/or the exchange of multimedia content between two or more users 101 via one or more sending end-points 110A and receiving end-points 110B. A sending end-point 110A may comprise an electronic device, such as a LBMC client device 700, which may be configured to provide multimedia content 171 with one or more receiving end-points 110B. A receiving end-point 110B may also comprise an electronic device, such as a LBMC client device 700, and LBMC client devices 700 may simultaneously or sequentially function as sending end-points 110A and receiving end-points 110B during the course of a video conferencing event or other exchange of multimedia content. For example, a first user 101 may view multimedia 2D or 3D video conferencing of a second user 101 on a LBMC client device 700 that is acting or functioning as a receiving end-point 110B, while the LBMC client device 700 of the second user 101 may be acting or functioning as a sending end-point 110A. During the course of a multimedia conferencing session, one or more LBMC client devices 700 may function as both sending end-points 110A and receiving end-points 110B.

In some embodiments, the system 100 may use identically stored multimedia content in index libraries 161, 162, at the sending end-point 110A and receiving end-point 110B to enable load balancing of processing, computing, network, quality control and security tasks normally done at the sending end-point 110A which can be done with time and resources otherwise wasted thus providing efficiencies of time and capacity which may be capitalized upon to adjust multimedia conferencing session data 179 variables to improve quality in constrained bandwidth situations. The load balancing improvements discussed herein reduce processing time and resource utilization.

Load balancing is the process of distributing network traffic and processor load across two or more servers 300 or other electronic devices. This ensures no single multimedia server 300 or other electronic devices bears too much demand. By spreading the multimedia distribution work evenly, load balancing improves application responsiveness.

In preferred embodiments, the system 100 allows the multimedia end-points 110 to make better use of otherwise wasted communications and processing resources and save time by allowing the receiving end-point 110B to assist the sending end-point 110A with processing tasks that in prior art are accomplished solely by the sending end-point 110A. The net time savings provided by the system 100 are exploited to adapt multimedia session data 179 variables, such as frame size, resolution, data instructions, frames per second (speed), security and authorization data, such as block chain and multi-factor authentication data, context parameters, instructions, graphics and templates, protocols, resolution to use, sensor data, lighting, geo-location information, multimedia context parameters, instructions, web pages, SMS text coded data, protocol layer data, graphics and templates, sensor, location data, system and control data, encryption key data, multi-factor authentication data, audio segments, audio signal reference points, timing signals, phonemes, one or more sets of parameters or coefficients generated from locations of key feature, key points, reference points, and object landmark points characterizing key features as object content in the current multimedia frame, accompanying any graphics and/or images and text such as sub-titles or computer data sent as text, etc. to improve low bit-rate conferencing experience for participants in bandwidth constrained networks, such as sparsely populated rural areas, for multimedia services including: telehealth (including telemedicine), remote work-at-home "telework", and in-home distance education.

In some embodiments, the system 100 may be configured for multimedia videoconferencing (talking-head, face-toface), and makes it possible for the sending end-point 110A to perform some but not all of its customary sender face processing tasks from multimedia source inputs related to the sender's (sending user's 101) face while the receiving end-point 110B, benefitting from immediate simultaneous receipt of real-time audio signals, performs other sender face identification tasks such as deriving and computing portions of the sender's face using techniques, such as phoneme/viseme identification and matching, stored image retrieval, audio and video data manipulation, synthetic transformation, adjustment, security, quality control and computational tasks, and then the receiving end-point 110B may provide the results back to the sending end-point 110A to reduce overall time needed for both sending end-point 110A and receiving end-point 110B to manipulate and display the sending end-point's 110A face image. For example, the sending end-point 110A may compute the sender's face segments focusing only on key face segments, such as sender's eyes and chin and jaw (hereafter REST OF FACE), while the receiving end-point 110B may simultaneously focus only on audio derivation of the mouth viseme (hereafter DERIVED MOUTH). Both end-points 110A, 110B, may swap index information (identically stored face segments from their index libraries 161, 162, which may act as training databases), make a composite sender face image (hereafter ESTIMATED FACE) from this information and from stored sender face training data, synthetic and background data and render a current frame sender face image. In situations where the sending end-point 110A receives the DERIVED MOUTH image too late for the current frame from the receiving end-point 110B, the sending end-point 110A could display the last true sending end-point 110A (hereafter TRUE MOUTH) image used instead for its own local display of the current frame but sends the TRUE MOUTH corrections (e.g. coefficients, parameters) to the DERIVED MOUTH index to the receiving end-point 110B to update the receiving end-point 110B receiving index library 162 as it creates and stores this new TRUE MOUTH image for subsequent use as needed. Erroneous local display of the sending-endpoint's 110A mouth image in this case is significantly less important than the receiving end-point 110B receiving the timely REST OF FACE synthesized with the ESTIMATED MOUTH to process and display a timely ESTIMATED FACE. Processing may be accomplished, in some embodiments, via me methods which may use synthetic data as with Avatar data and random eye movements, and minor face movements, to apply to the speaker and listeners faces, etc., to make a composite face look less stilted but more flowing more lifelike and realistic. Optionally, some Avatar synthetic data may be used to provide a more pleasing stitching and transition between composite frames to look more natural. Thus the sending end-point 110A and the receiving end-point 110B work together cooperatively according to a load balancing procedure and in a way that allows both sending 110A and receiving 110B end-point index libraries 161, 162, to improve their accuracy over time as the receiving end-point 110B becomes trained with increasingly better mouth images (phoneme-derived visemes) based upon TRUE MOUTH images, coefficients and parameters.

In some embodiments, a sending end-point 110A may periodically send coefficients and parameters with previous REST OF FACE image indexes to the receiving end-point 110B to update the receiving end-point 110B receiving index library 162 as it creates and stores the TRUE REST OF FACE image for subsequent use as needed.

In some embodiments, a sending end-point 110A may skip frames periodically to use additional time to create a best TRUE MOUTH and REST OF FACE images. Likewise, the sending end-point 110A may skip TRUE MOUTH and REST OF FACE images periodically to update its sending index library 161 of REST OF FACE images with better eyes, better chin, etc. and index them and send them with coefficients and parameters. as more REST OF FACE images. Likewise, the receiving end-unit 110B may skip a frame or two to use the time to provide a better DERIVED MOUTH. In some embodiments of the system 100, in some cases the sending end-point 110A and the receiving end-point 110B may calculate a future (predicted) video portion and send that index so that by the time it gets displayed it is current in time.

The load balancing at both the sending (transmitting) end-point 110A and receiving end-point 110B not only saves precious time which can be used more wisely to make adjustments to conferencing variables to improve quality, but also to significantly reduce processing and communications system capacity requirements as well as reduce the amount of information to be transmitted from a sending end-point 110A to a receiving end-point 110B for multimedia conferencing. In preferred embodiments, identical index libraries 161, 162, are at both end-points 110A, 110B, respectively, and they are maintained through the quality control process, most of the face information which is the largest component of bandwidth requirements is reduced to image indexes, each of relatively few bits compared to processing large amounts of video data required for pixels, images, coefficients, framing protocols, etc.

In preferred embodiments, the system 100 may comprise identical multimedia-related data content, typically face-related data for videoconferencing, stored in advance at the sending end-point 110A and receiving end-point 110B to reduce processing time required at sending 110A and receiving 110B end-points, within network communications systems and processors, and eliminates significant inter-system system 100 processing tasks. Most importantly, the system 100 is able to significantly reduce the amount of real-time data transmission streaming normally required between sending 110A and receiving 110B end-points which will allow users 101 with low-bit rate connections, such as older style, legacy standard phone lines to take advantage of otherwise economically and/or technically infeasible multimedia conferencing services which can be emulated and/or virtualized with the system 100 over significantly lower-speed networks 105.

Data files delivered over networks 105, such as the Internet, including video, voice, text, graphics, etc. are often delivered to an end-user 101 through a broadband Internet transmission network or other delivery mechanism. These include methods such as Digital Subscriber Loop (DSL), WiFi, cable, 4G/Long Term Evolution (LTE), 5G, fiber, satellite, Ethernet, radio, optics, etc. and the multimedia content normally has audio, video and data components, with the audio portions of the content delivered to and output by an audio player (e.g., a speaker system, headphones, etc.) video portions of the content delivered to and output by a video display (e.g., a 4K television, smart phone, computer monitor, set-top box, cell phone, etc.) and data components output by a data device, such as a computing device, Short Message Service (SMS) text device or a router. Multimedia content 171 can be arranged in a number of ways, including in the form of streamed content in which separate packets, or frames, of video, audio, and data are respectively provided to output devices. Since identical index libraries 161, 162, may be used at both the sending end-point 110A and receiving end-point 110B, the system 100 enables the receiving end-point 110B to make full use of otherwise wasted communications and processing resources during audio receiving end-point 110B skewing time and to save time by having the receiving end-point 110B assist the sending end-point 110A with tasks that are usually sending end-point 110A communications, security and processing tasks.

These savings of time, and other resources, such as network, processors, security, can be exploited to provide more time than would otherwise be available to adjust the multimedia system variables where they are needed in order to improve session experience for multimedia conference participants or users 101. In preferred embodiments, the system 100 may leverage the use of identical near-end and ear-end index libraries 161, 162, real-time communications, high speed processing, e.g. for image rendering, image identification, retrieval, image adjustment, alignment, security processes and display. This enables the system 100 to exploit otherwise wasted receiving end-point 110B audio skew time and balances the overall end-to-end process of 1 way and/or 2 way multimedia delivery to gain system efficiency and effectiveness.

In preferred embodiments, the system 100 addresses a service gap for essential face-to-face, "talking head" services, such as telemedicine, distance learning, and remote telework, that are not technically and economically feasible to be accessed in rural areas or areas having low bandwidth networks 105 and therefore these "talking head" services are only sparsely available using prior art methods. Approximately 30% of rural areas in the United States of America, according to the USDA in 2019, remain unserved or underserved by fixed broadband. Preferably, the system 100 may leverage or utilize identical sending end-point 110A and receiving end-point 110B index libraries 161, 162, with high speed processing of programs, images, audio files, etc. (e.g. for image identification, retrieval, image adjustment, alignment, and display of many new services including telehealth, telework and distance education in-home surveillance and telemetry, Internet of Things (IoT) services, educational game sequences, medical monitoring, educational test scoring, time card and order entry, hyper-text mark-up language (HTML) templates, etc. Additionally, the system 100 may improve and enable many existing yet developing rural telecommunications services, video content delivery, data centers services (e.g. security monitoring); remote data storage; home Information Technology (IT) support; assured immersive telepresence; interactive/networked gaming and virtual reality, home automation and home Artificial Intelligence (AI); emulated life-like entertainment (virtual concerts, etc.), home office applications for rural small business farms/virtual office, data and system back-ups; live, immersive/friends/family events; new video-intensive social applications; cloud-uploads/downloads; live travel excursions; 4K video TV and music file sharing; Short Message Service (SMS) text-based multi-media and interactive homework, etc. security monitoring, video surveillance, video emergency (e.g. video-based 911 applications as these emerge)).

In some embodiments, the system 100 may perform a method via a sending end-point 110A that may comprise: monitoring resource and performance status; determining multimedia load balancing procedure; receiving raw multimedia source and other inputs; decoding multimedia source and other input; transmitting some sending end-point 110A data to the receiving end-point 110B; while simultaneously processing some sending end-point 110A data itself; receiving some processed sending end-point 110A data back from the receiving end-point 110B; processing more sending end-point 110A data modifying, morphing and adjusting these and other data; determining quality score and computing variable changes required; making required variable changes; displaying; providing status updates and requests; storing; and continuing In some embodiments, the system 100 may perform a method via a receiving end-point 110B that may comprise: monitoring resource and performance status; determining a multimedia load balancing system procedure; receiving some sending end-point 110A multimedia data such as an immediate real-time audio speech signal; decoding the received sending end-point 110A audio data 172; processing received sending end-point 110A data, by conducting phoneme-to viseme mapping; transmitting some processed sending end-point 110A data back to a sending end-point 110A; processing more received sending end-point 110A data, modifying, morphing and adjusting data; determining quality score and variable changes; making required variable changes; displaying; providing status updates and requests; storing; and continuing In some embodiments, the system 100 may provide access to real-time audio signal, available audio processing capacity and audio skewing time available, to focus on identifying and synthesizing the parts of the face that are most correlated to speech this being the region around the sending end-point's 110A mouth (lips, cheeks, and chin), hereafter ESTIMATED MOUTH SEGMENT, with sending-end point talking head's face image eyes, head, upper, torso, background, (hereafter REST OF FACE) from training images.

In some embodiments, the audio skew may intentionally be increased by the system 100 as a variable adjustment, normally at, but not limited to the receiving end-point since lip-synch is not detectable unless certain delay boundaries are reached. Intentionally increasing audio skew may in some cases allow for more time to improve the multimedia conferencing session by the system 100.

In some embodiments, encryption techniques, such as blockchain and authentication methods, such as multi-factor authentication may be used in conjunction with the sending 110A and receiving 110B end-point processing due to the growing threat of cyber-crime and HIPAA privacy issues related to one-way and two-way multimedia service distribution related to telehealth (including telemedicine), remote work-at-home "telework" and in-home distance education.

In some embodiments, the system 100 may include or be in communication with a blockchain network 111, having one or more nodes 111A, which may be in communication with one or more servers 300, and/or LBMC client devices 700 of the system 100. A node 111A may be a server 300, an electronic device, a LBMC client device 700, or any other suitable networked computing platform. The blockchain network 111 may manage a distributed blockchain database containing data recorded by the one or more electronic devices of the system 100. The data recorded by the one or more electronic devices may be maintained as a continuously growing ledger or listing of the data recorded by the one or more electronic devices, which may be referred to as blocks, secured from tampering and revision. Each block includes a timestamp and a link to a previous block. Through the use of a peer-to-peer blockchain network 111 and a distributed timestamping server 300, a blockchain database may be managed autonomously. Consensus ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction data input results in a different hash value being computed, which indicates potentially compromised transaction input. Digital signatures ensure that data entry transactions (data added to the blockchain database) originated from senders (signed with private keys) and not imposters. At its core, a blockchain database may record the chronological order of data entry transactions with all nodes 111A agreeing to the validity of entry transactions using the chosen consensus model. The result is data entry transactions that are irreversible and agreed to by all members in the blockchain network 111.

The blockchain network 111 may comprise a cryptocurrency or digital asset designed to work as a medium of exchange that uses cryptography to secure its transactions, to control the creation of additional units, and to verify the transfer of assets. Example cryptocurrencies include Bitcoin, Ether, Ripple, etc. The blockchain network 111 may also comprise tokens common to cryptocurrency based blockchain networks 111. The tokens may serve as a reward or incentive to nodes 111A for blockchain network 111 services and to make the blockchain network 111 attach resistant. The blockchain network 111 may comprise token governance rulesets based on crypto economic incentive mechanisms that determine under which circumstances blockchain network 111 transactions are validated and new blocks are created. Tokens may include usage tokens, utility token, work tokens, behavioral tokens, Intrinsic, Native or Built-in tokens, application token, asset-backed tokens, or any other type of token which may be used in a cryptocurrency network.

In some embodiments of the system 100, load balancing may be static or dynamically determined by the sending end-point 110A, the receiving end-point 110B, neither or both and may use master/slave configuration and/or any combination thereof.

In some embodiments of the system 100, determining a load balancing procedure may be the logic to decide which portions of sending end-point 110A multimedia data processing should be performed and when by the sending end-point 110A and/or the receiving end-point 110B and which networks 105 and protocol layers should be used and when depending upon decision criteria including, but not limited to, the availability of sending end-point 110A and receiving end-point 110B resources, time, and processing capabilities, network availability, security and authentication required, quality score results, bandwidth constraints, desired output speed, resolution, etc.

In some embodiments of the system 100, a receiving end-point 110B may be configured for: receiving multimedia conferencing data from a sending end-point 110A, in which the receiving end-point 110B receives sending end-point 110A multimedia session data by one or more communications methods and at one or more times before, during or after a multimedia communication session and/or any combination thereof.

In some embodiments of the system 100, communications methods described herein may comprise one or more networks, times, protocols, formats, speed, communications processing in parallel or serially and/or any combination thereof.

In some embodiments of the system 100, a receiving end-point 110B may be configured for: processing the received sending end-point 110A multimedia data to assist the sending end-point 110A in processing, identification, matching and/or retrieval of one or more stored multimedia content segments and/or template indexes which are similar to current sending end-point 110A multimedia session content, wherein session templates and/or template data, background data, synthetic data are stored identically in index libraries 161, 162, at sending 110A and receiving 110B end-points, respectively.

In some embodiments of the system 100, multimedia session data 179 may include one or more sets of parameters or coefficients generated from locations of key feature, key points, reference points, and object landmark points characterizing key features as object content in the current multimedia frame, accompanying any graphics and/or images and text such as sub-titles or computer data sent as text, session information such as sensor data, lighting, geo-location information, security and authorization data such as block chain and multi-factor authentication data, context parameters, instructions, graphics and templates, sensor, timing, location data, system and user control data and multimedia transmission session information, etc. audio data, indexes of audio and video face segments, coefficients, parameters, indexes of audio and video data, session and other multimedia conferencing data by a receiving end-point.

In some embodiments of the system 100, a receiving end-point 110B may be configured for: sending multimedia session data 179 to sending end-point 110A, and the receiving end-point 110B transmits processed sending end-point 110A multimedia data back to the sending end-point 110A by one or more communications methods.

In some embodiments of the system 100, communications methods may comprise one or more networks, times, protocols, formats, speed, communications, security and encryption processing in parallel or serially and/or any combination thereof.

In some embodiments of the system 100, the transmitting of face data by a sending end-point 110A may includes one or more sets of parameters or coefficients generated from locations of key feature, key points, reference points, and object landmark points characterizing face features as object content in the current multimedia frame, accompanying and graphic images and text such as sub-titles or computer data sent as text, session information such as sensor data, lighting, geo-location information, context parameters, security and authorization data such as block chain and multi-factor authentication data, instructions, graphics and templates, sensor, timing, location data, system and user control data and multimedia transmission session information, etc. audio signals, and audio data, indexes of audio and video face segments, coefficients, parameters, indexes of audio and video data, session and other multimedia conferencing data to a receiving end-point 110B.

In some embodiments, the system 100 may comprise one or more processors and memory coupled to the one or more processors configured for storing instructions, which, when executed by the one or more processors, causes a sending end-point 110A to determine a load balancing procedure associated with the multimedia conferencing transmission send audio, video and other sender face-related data to a receiving end-point receive portions of sending end-point 110A multimedia data associated with a current multimedia frame portion of a multimedia conferencing transmission from a receiving end-point 110B based upon a load balancing procedure, wherein communications and processing tasks, networks and processors are implemented in parallel between the sending end-point 110A and the receiving end-point 110B. In further embodiments, the instructions may cause sending end-point 110A to adjust multimedia conferencing session variables to improve multimedia conferencing quality score. In further embodiments, the instructions further cause the sending end-point 110A to: identify locations of the object landmark points to segment background content of the current transmitting face data from the object content of the current sending multimedia session data; and transmit one or more indexes to identify similar background content and/or similar transmitting face object content of the video portion of the current transmitting face data to the receiving end-point 110B, in which similar background content and similar object content are stored identically at transmitting and receiving end-point.

In some embodiments, the system 100 may comprise one or more processors; memory coupled to the one or more processors and configured for storing instructions, which, when executed by the one or more processors, causes a receiving end-point 110B to determine a load balancing procedure associated with the multimedia conferencing transmission receive audio, video and other sender face-related data from a sending end-point 110A; receive portions of sending end-point 110A multimedia data associated with a current portion of a multimedia conferencing transmission from a sending end-point 110A based upon a load balancing procedure, wherein communications and processing tasks, networks and processors are implemented in parallel between the sending end-point 110A and the receiving end-point 110B.

In some embodiments, the system 100 may comprise a non-transitory computer-readable storage medium configured for storing instructions, which, when executed by one or more processors, causes a sending end-point 110A to: send by the sending end-point 110A, audio and partial transmitting face data to the receiver, identify locations of object landmark points characterizing object content in current transmitting face data of a multimedia conferencing transmission; generate parameters or coefficients from the locations of the object landmark points; determine a current load balancing procedure associated with the multimedia conferencing transmission; determine a quality score condition of the current transmission, send portions of transmitting face data associated with a current multimedia frame portion of a multimedia conferencing transmission from a sending end-point 110A, to a receiving end-point 110B with or without the current multimedia frame based upon determination of a load balancing procedure, wherein communications and processing tasks associated with stored transmitting face data and/or current transmitting face data are processed in parallel between the sending end-point 110A and the receiving end-point 110B based upon a load balancing rule and/or quality score results and adjust transmitting face data processing variables.

In further embodiments, the instructions may further cause the sending end-point 110A to: identify locations of the object landmark points to segment background content of the current transmitting face data from the object content of the current sending multimedia session data; and transmit one or more indexes to identify similar background content and/or similar transmitting face object content of the video portion of the current transmitting face data to the receiving end-point 110B, wherein similar background content and similar object content are stored identically at transmitting and receiving end-point 110B.

In further embodiments, the instructions may further cause the sending end-point 110A to: identify locations of object landmark points characterizing object content in current transmitting face data of a multimedia conferencing transmission; generating parameters or coefficients from the locations of the object landmark points;

In further embodiments, the instructions may further cause the sending end-point 110A to send portions of transmitting face data associated with a current multimedia frame portion of a multimedia conferencing transmission from a sending end-point 110A, to a receiving end-point 110B with or without the current multimedia frame based upon determination of a low bandwidth condition, in which communications and processing tasks associated with stored transmitting face data and/or current transmitting face data may be processed in parallel between the sending end-point 110A and the receiving end-point 110B based upon a load balancing rule and/or quality score results and adjusting transmitting face data processing variables.

In some embodiments, the system 100 may comprise a non-transitory computer-readable storage medium configured for storing instructions, which, when executed by one or more processors, causes a receiving end-point 110B to: receive one or more portions of transmitting face data based upon a load balancing procedure and based upon determination of a low bandwidth condition with or without the current multimedia frame portion of sending multimedia session data; perform a search, using all or part of the received sender face data, of a data structure storing previously stored identical data content in both the sending end-point 110A and the receiving end-point 110B and transmitting and receiving end-point face data 110B; retrieve, previously stored data content similar to the object content of the current transmitting face data based on performing the search of the data structure; and display, one or more retrieved portions of transmitting face data and in place of the current one or more portions of the transmitting face data.

In further embodiments, the instructions may further cause the receiving end-point 110B to perform a search, using all or part of the received sender face data, of a data structure storing previously stored identical data content in both the sending end-point 110A and the receiving end-point 110B and transmitting and receiving end-point 110B face data; retrieving, by the receiving end-point 110B, previously stored data content similar to the object content of the current transmitting face data based on performing the search of the data structure; and displaying, by the receiving end-point 110B, one or more retrieved portions of sending end-point 110A face data and in place of the current one or more portions of the sending end-point 110A face data.

Figure 2:
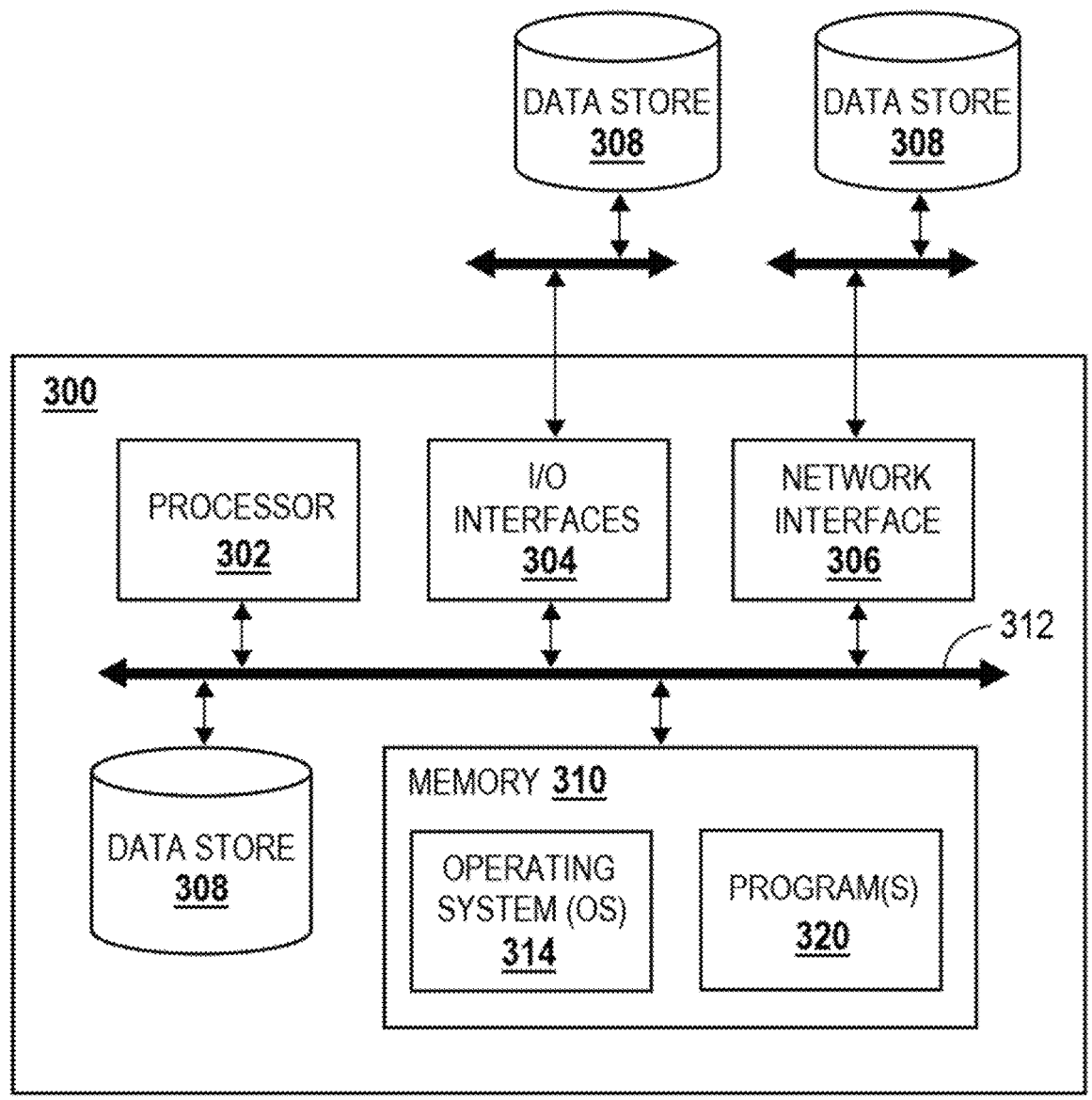
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008/2012/2016 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like.

The one or more programs 320 may be configured to implement the various processes, algorithms, methods, techniques, etc. described herein.

Figure 3:
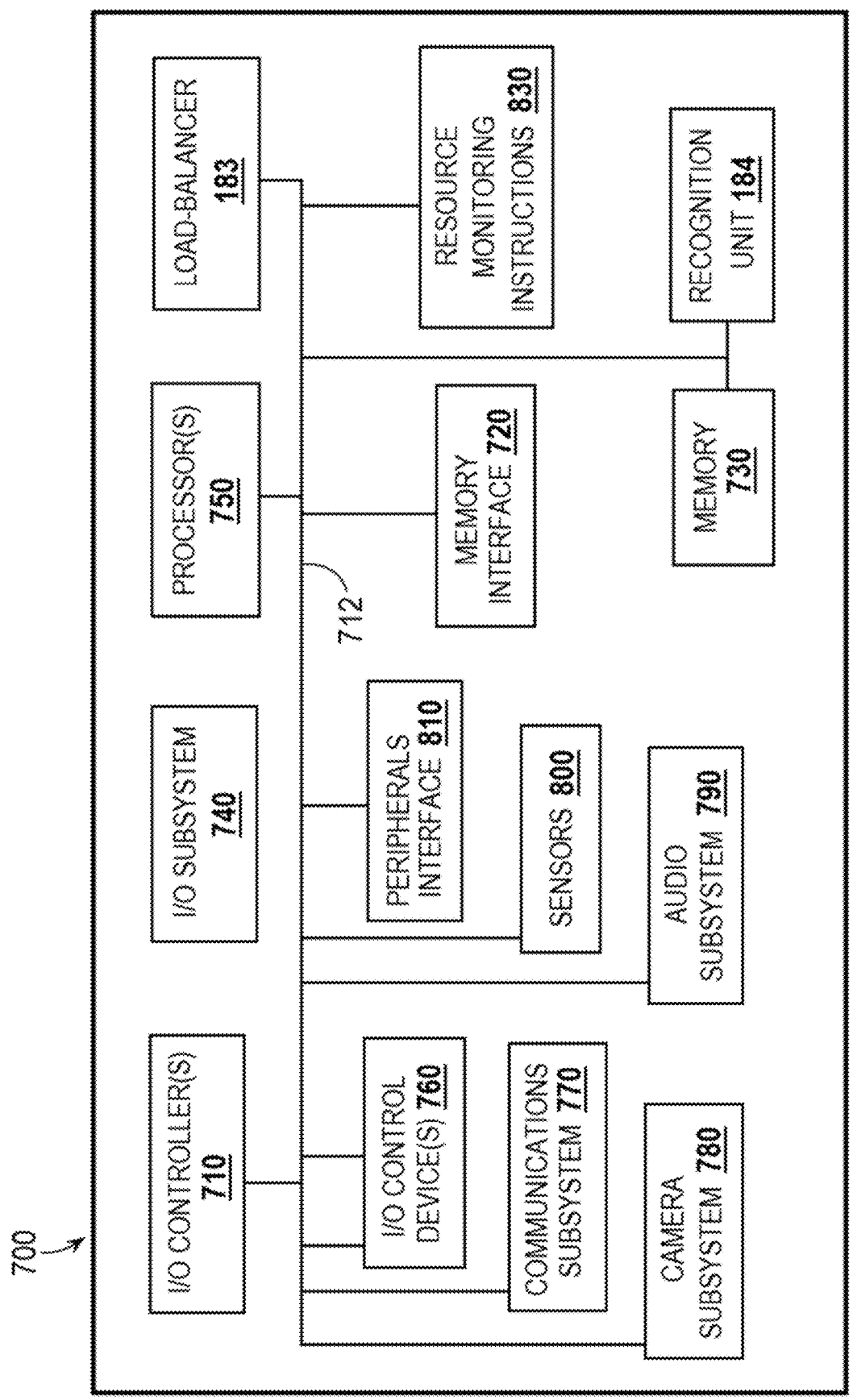
FIG. 3 shows a block diagram illustrating an example architecture of a Load Balancing Multimedia Conferencing client device which may be used by the system as described in various embodiments herein.

Referring to FIG. 3, in an exemplary embodiment, a block diagram illustrates n example of a LBMC client device 700 architecture of which one or more may be used in the system 100 or the like and which may be a type of computing platform. An LBMC client device 700 architecture can be implemented in any suitable electronic or client device, including but not limited to portable or desktop computers, smart phones and electronic tablets, television systems, game consoles, kiosks and the like. It should be appreciated by those of ordinary skill in the art that FIG. 3 depicts the architecture of a LBMC client device 700 in an oversimplified manner, and a practical embodiment may include additional components and suitably configured processing logic to support known or conventional operating features that are not described in detail herein.

The LBMC client device 700 can be a digital device that, in terms of hardware architecture, generally includes a memory interface 720, data processor(s), image processor(s) or central processing unit(s) 750, and peripherals interface 810. Memory interface 720, processor(s) 750 or peripherals interface 810 can be separate components or can be integrated in one or more integrated circuits. The components (750, 810, 720, 740, 820, etc.) are communicatively coupled via a local interface 712. The local interface 712 can be, for example but not limited to, one or more buses or other wired or wireless connections, as is known in the art. The local interface 712 can have additional elements, which are omitted for simplicity, such as controllers, buffers (caches), drivers, repeaters, and receivers, among many others, to enable communications. Further, the local interface 712 may include address, control, and/or data connections to enable appropriate communications among the aforementioned components.

The processor(s) 750 is a hardware device for executing software instructions. The processor 750 can be any custom made or commercially available processor, a central processing unit (CPU), an auxiliary processor among several processors associated with the client device 400, a semiconductor-based microprocessor (in the form of a microchip or chip set), or generally any device for executing software instructions. When the LBMC client device 700 is in operation, the processor 750 is configured to execute software stored within the memory instructions 730, to communicate data to and from the memory instructions 730, and to generally control operations of the LBMC client device 700 pursuant to the software instructions. In an exemplary embodiment, the processor 750 may include a mobile optimized processor such as optimized for power consumption and mobile applications.

The I/O subsystem 740 can be used to receive data and user input and/or for providing system output. User input can be provided via a plurality of I/O interfaces, such as a keypad, a touch screen, a camera, a microphone, a scroll ball, a scroll bar, buttons, bar code scanner, voice recognition, eye gesture, and the like. System 100 output can be provided via a display screen such as a liquid crystal display (LCD), touch screen, and the like. The interfaces of the I/O subsystem 740 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O subsystem 740 can include a graphical user interface (GUI) that enables a user to interact with the client device 400. Additionally, the I/O subsystem 740 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

In some embodiments, sensors, devices, and other elements of the I/O subsystem 740 can be coupled to peripherals interface 810 to facilitate multiple functionalities. For example, sensors (motion, lighting, etc.) 800 can be coupled to peripherals interface 810 to facilitate orientation, lighting, and proximity functions of the device.

In some embodiments, sensor 800 (e.g., an accelerometer, gyros) can be utilized to detect movement and orientation of the device 700. Accordingly, display objects or media can be presented according to a detected orientation (e.g., portrait or landscape).

Other sensors can also be connected to peripherals interface 810, such as a temperature sensor, a biometric sensor, or other sensing device, to facilitate related functionalities.

The I/O subsystem 740 may comprise or be in communication with a camera subsystem 780 and a sensor 800, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 770. Communication subsystem(s) 770 can include one or more wireless communication subsystems which may enable wireless communication to an external access device or network. Wireless communication subsystems 770 can include radio frequency receivers and transmitters and/or optical (e.g., infrared) receivers and transmitters. Wired communication subsystems 770 can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 770 can depend on the communication network(s) or medium(s) over which the device is intended to operate. Any number of suitable wireless data communication protocols, techniques, or methodologies can be supported by the communication subsystems 770, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); global system for mobile communications (GSM) network, a GPRS network, an enhanced data GSM environment (EDGE) network, code division multiple access (CDMA) networks, and other cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. Communication subsystems 770 may include hosting protocols such that the device 700 may be configured as a base station for other wireless devices. As another example, the communication subsystems 770 may allow the device 700 to synchronize with a host device using one or more protocols, such as, for example, the TCP/IP protocol, HTTP protocol, UDP protocol, and any other known protocol.

Audio subsystem 790 can facilitate voice-enabled functions, digital recording, and telephony functions. Recognition unit 184 can implement recognition and phoneme detection and voice replication.

I/O subsystem 740 can include controller(s) 710 which can be coupled to other input/control devices. In some implementations, device 700 may present recorded audio and/or video files, such as MP3, AAC, and MPEG files. In some implementations, device 700 can include the functionality of an MP3 player and may include a pin connector for tethering to other devices. Other input/output and control devices can be used.

Memory interface 720 can be coupled to memory 730. Memory 730 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 730 may incorporate electronic, magnetic, optical, and/or other types of storage media. Note that the memory 730 may have a distributed architecture, where various components are situated remotely from one another, but can be accessed by the processor 750. The software in memory 730 can include one or more software programs, each of which includes an ordered listing of executable instructions for implementing logical functions. In the example of FIG. 3, the software in the memory system 730 includes a suitable operating system (O/S) and programs.

The operating system essentially controls the execution of other computer programs, and provides scheduling, input-output control, file and data management, memory management, and communication control and related services. The operating system may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like. The programs may include various applications, add-ons, etc. configured to provide end user functionality with the client device. For example, exemplary programs may include, but not limited to, a web browser, social networking applications, streaming media applications, games, mapping and location applications, electronic mail applications, financial applications, and the like.

Load balancer 183 which implements the features and processes described in 503 and 603 of methods 500 and 600 and facilitates processing of logic instructions to compute appropriate load balancing procedures.

Each of the above identified instructions and applications can correspond to a set of instructions for performing one or more functions described above. These instructions need not be implemented as separate software programs, procedures, or modules. Memory 730 can include additional instructions or fewer instructions. Furthermore, various functions of the mobile device may be implemented in hardware and/or in software, including in one or more signal processing and/or application specific integrated circuits.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

Figure 4:
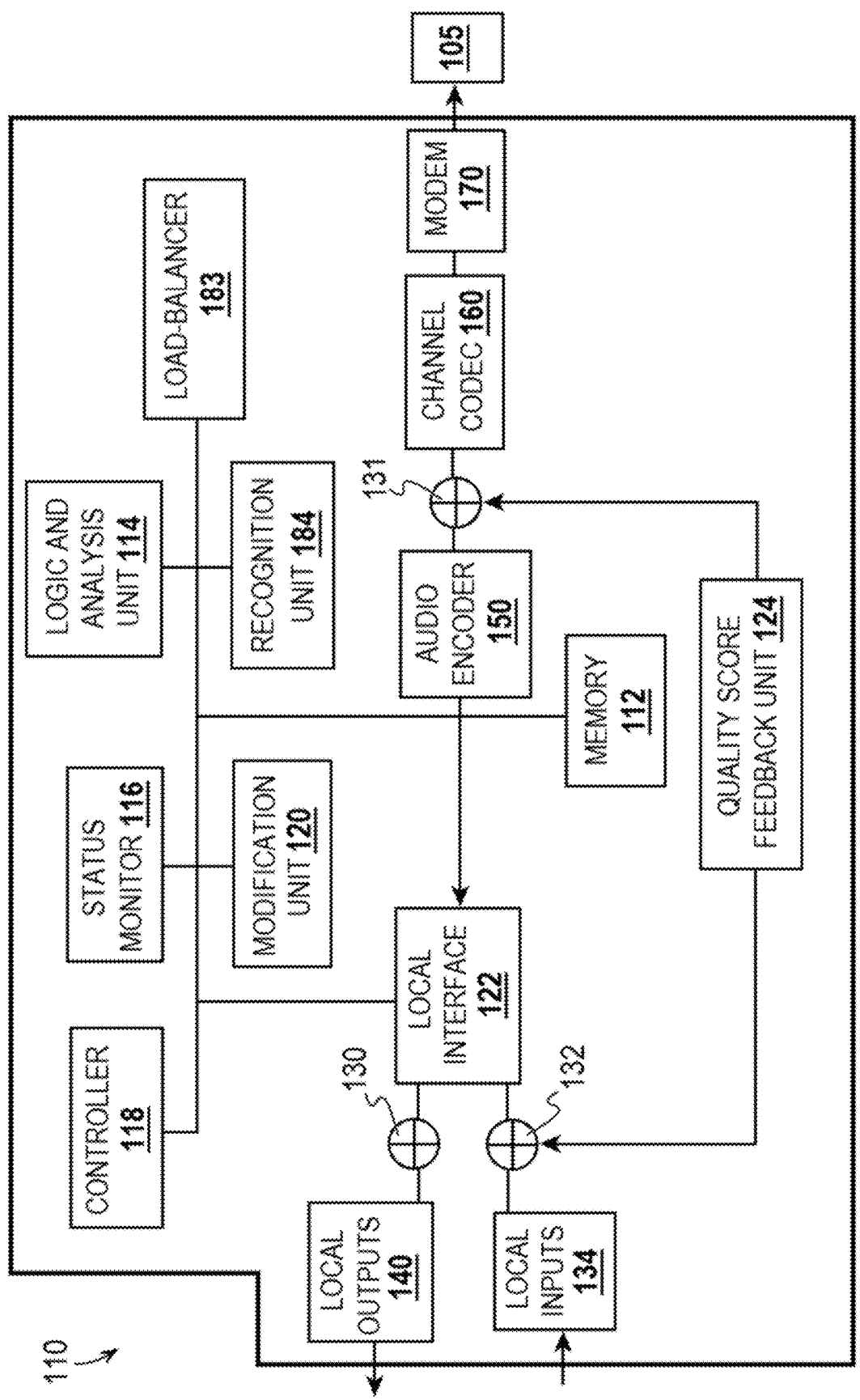
FIG. 4 depicts a block diagram of an end-point of the system, such as a sending end-point or a receiving end-point, which may be configured for providing multimedia delivery according to various embodiments described herein.
Figure 5:
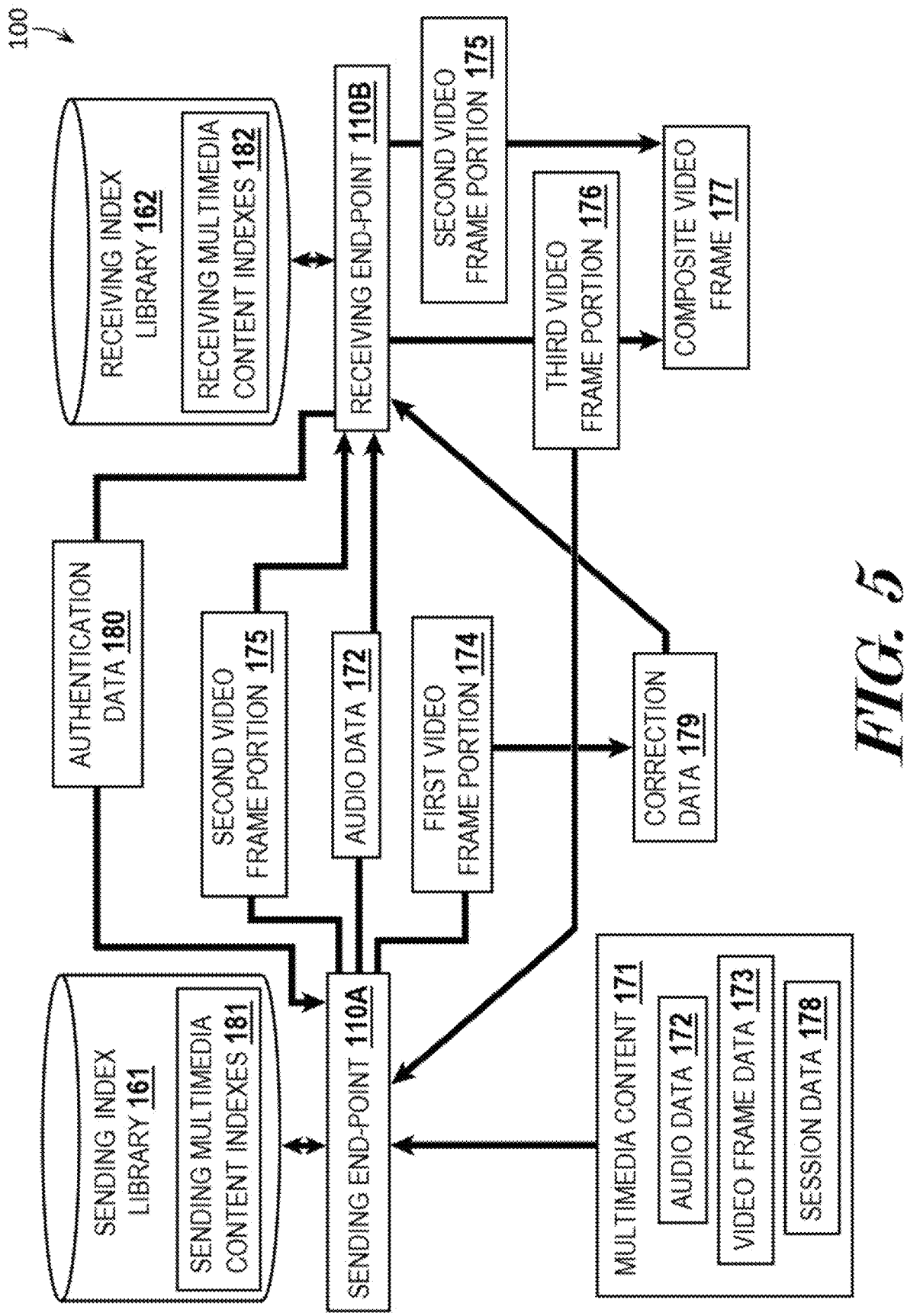
FIG. 5 illustrates a block diagram of an example workflow of a Load Balancing Multimedia Conferencing System according to various embodiments described herein.

FIG. 4 illustrates a block diagram of an end-point of the system 100, such as a sending end-point 110A or a receiving end-point 110B, which may be configured for providing multimedia delivery. In some embodiments, an end-point 110 of the system 100 may be any device, such as a LBMC client device 700, capable of transmitting and/or receiving multimedia transmissions, including but not limited to hardware and/or software implementations of video telephony devices (e.g., smart phones, smart phones, wearable devices), electronic tablet devices, video and surveillance cameras, computers with webcams (including notebook computers with embedded video cameras), videophones, picture phones, simulation computers, synthetic media, video gaming devices, in-home/in vehicle/in aircraft/in vehicle audio and video smart devices, home controllers and content servers, network-based cloud devices, video bridge units and multimedia session MCUs, bridges and multimedia servers, etc. with optional encryption and multi-factor authentication Network 105, inputs 134, and outputs 140 may use any combination of common communications technologies, protocols, multiplexing, channelization, frequency spectrum, modulation, emission, and layers of network protocols, formats, authentication and encryption networks and topologies, including wired and wireless, such as a Wide Area Network (WAN) and Local Area Networks (LANs). For example, an end-point 110 may include wireless communication subsystems designed to operate over a global system for mobile communications (GSM) network, Long-Term Evolution LTE/4G/and newer 5G networks) a General Packet Radio Service (GPRS) or other packet oriented mobile data standard such as but not limited to data GSM environment (EDGE) network, 802.x communication networks (e.g., Wi-Fi, WiMAX, or 3G, 4G, 5G networks), code division multiple access (CDMA), frequency division multiple access (FDMA), time division multiple access (TDMA) networks, AM/FM/SSB/Amateur other commercial radio, satellite, TV, and Bluetooth©, GPS, RFI network, etc. An example of a WAN would be the Internet. Examples of communication networks include a LAN, a WAN and the computers and networks forming the Internet. Another example is the public switched telephone network (PSTN). Network 105 can enable access to any number and types of wired and wireless devices (e.g., routers, hubs, modems, optical devices, network interface cards (NIC), media converters, switches, bridges, wireless access points, encryption devices and systems providing blockchain, multi-factor authentication etc. facilitating use of known and emerging audio, video and data transmission and multimedia conferencing protocols, such as the protocols found in the International Telecommunications Union (ITU) H.264, H.320, H.323, H.324, H.331, V.70 and V.80 standards.

FIG. 4 depicts an exemplary end-point 110 that comprises a microphone 134 that obtains voice inputs, an audio encoder 150 that encodes and/or decodes the obtained voice inputs, a memory unit 112 that captures an audio signal, image or other inputs, a controller 118 and modification unit 120 that works with current audio, video and other data along with multimedia session-related data 179 stored in memory to be available to create a multimedia audio, video, data/graphics image, information set, or multimedia segment frame. Network 105, uses optional encryption techniques such as block chain and authentication methods, such as multi-factor authentication, inputs 134, and outputs 140 can use any combination of audio, 2D and/or 3D video, graphics, data, or session-related content. Audio content includes, for example, portions of audio signals and other inputs which may be in audio form, such as image information, reference points, timing signals, phonemes, viseme identifiers, non-voice audio data 172 including audio data 172, music, sounds, audio tracks for a movie, etc. Video data includes for example, 2D and/or 3D facial view reference data including spatial and timing information, video segment and frame indexes, complete and/or partial face and other data segments, one or more sets of parameters or coefficients associated with video and other frames, face data and background indexes, synthetic image material, movies, video clips pictures and/or segments of a multimedia transmission from a sending end-point, one or more sets of parameters or coefficients generated from locations of object landmark points characterizing 2D and/or 3D object content in the current multimedia frame, text such as subtitles or computer data sent as accompanying text, session and semantic information such as sensor data, lighting, geo-location information, multimedia context parameters, instructions, web pages, SMS text coded data, protocol layer data, graphics and templates, sensor, location data, system and control data, encryption key data, multi-factor authentication data 180 and end-point 110 session information 179, etc.

Users 101 of local input 134 and output devices 140 can participate for example, in a multimedia conferencing session with the end-point 110. The end-points 110 may send and receive multimedia transmission communications to and from other devices 110, 700, through the use of network 105, outputs 140 and inputs 134. End-point 110 may include or otherwise have access to, an index library 161, 162, which has identically stored data at both sending end-point 110A and receiving end-point 110B. This identical data may include sending multimedia content indexes 181 (stored in sending index library 161) and receiving multimedia content indexes 182 (stored in receiving index library 162), and the indexes 181, 182, may comprise any combination audio and/or video data or computer data sent as text, or session data or information 179, etc. as described in reference to FIGS. 6 and 7. The controller 118 controls processing of data according to end-point 110 session data 179 instructions and its purpose.

In some implementations, multimedia transmission coupled to network 105, inputs 134, and/or outputs 140 can provide multimedia conferencing services for establishing a multimedia session between and among multiple end-points 110. FIG. 4 illustrates one example of an end-point 110. Other multimedia communications and processing systems are also possible with more or fewer components. Although end-points 110 are referred to in this document as sending end-points 110A or receiving end-points 110B, it should be understood that end-points 110 can act as either or both a "sending end-point" and/or a "receiving end-point," and can send and receive encrypted and/or authenticated multimedia communications to and/or from other end-points 110 and can participate in a multimedia session, and process session-related data 179, such as instruction data, before, during and/or after a multimedia conferencing and/or distribution session.

Local Inputs 134 may include a video camera for capturing an image of a primary object of interest in the multimedia frame (hereafter also referred to as "object content"). The video camera can be embedded in the device or coupled to the device. Local Inputs 134 may include a video codec (e.g., ITU H.261-264) for processing multimedia frames (e.g., compressing multimedia frames) generated by the camera into a format that is compliant with a suitable multimedia transmission protocol (e.g., H.264, H.320, H.324, H.331 or H.323).

In some embodiments, a live video feed may be generated by a video camera type local input 134. The video feed captures an image of the sending user 101 (typically who is facing an embedded camera on the front of the end-point 110). As discussed in more detail below, in some implementations, object landmarks and landmark points are generated for the primary object of interest in the video portion of a multimedia frame, which in this example is the sender's face and specific face segments. The object landmarks characterize the primary object content of the multimedia frames. For each video frame, locations of the object landmarks and landmark points within a defined coordinate multimedia frame are detected and converted into one or more sets of coefficients and parameters that characterize the object content. The sets of coefficients and corresponding multimedia frame are stored in index libraries 161, 162, or other data structure of end-point 110 or stored remotely on, for example, a network device, such as a server 300.

In some embodiments, during operating conditions, system 100 uses logic instructions in logic and analysis unit 114 to compute the load balancing procedure required by the load balancer 183 based upon factors such as quality scores, current resource availability, overall time remaining, audio skewing time remaining, etc. for processing data. The load balancer 183 computes and manages load balancing procedures. In some embodiments, load balancing procedures may comprise instructions for sending end-point 110A and receiving end-point 110B, to collaborate and cooperate by dividing up the overall workload and coordinate their multimedia conferencing workload efforts and resources including task assignments for their associated processes and communications networks and protocols, etc., such as when end-points 110A, 110B, may be in close or substantially the same physical proximity, such as when two users 101 in the same location or local network 105 are video conferencing with other users 101 in a more distant location via a bandwidth constrained network 105. For example, a sending end-point 110A processing source input video data is not at all accustomed to passing small portions of data to the receiving end-point 110B in real-time and relying on the receiving end-point 110B to perform stored multimedia content 171 segment matching and retrieval steps for the sending end-point 110A and the receiving end-point 110B returning an index in real-time of the best matching stored index for a sending end-point 110A to further process for the sending end-point 110A to display and all quickly enough to keep the multimedia conferencing session life-like.

In some embodiments, during operating conditions the system 100 identifies locations of the object landmark points to segment background content of the current transmitting face data from the object content of the current sending multimedia session data 179; and transmits very small portions of these data according to a load balancing procedure using network 105 such as one or more indexes to identify similar background content and/or similar transmitting face object content and landmark points of the video portion of the current transmitting face data to the receiving end-point 110B, wherein similar background content and similar object content are stored identically at transmitting and receiving end-point 110B.

The block diagram of FIG. 4 depicts a generalized representation of an end-point 110 of the Load Balancing Multimedia Conferencing System 100 in accordance with various embodiments. In some embodiments, a recognition unit 184 operates to detect speech patterns by a human (or animated) speaker, and may perform voice print authentication, for example, and other audio sounds. The recognition unit 184 may employ well known techniques of detecting the presence of a human face or other object within a selected frame using color, shape, location, size and/or other detection parameters. Once a human face or other object is located, segments such as the mouth area of the face are located using well known proportion techniques. The recognition unit 184 may further operate to detect predefined lip/face movements such as visemes indicative of certain phonetic sounds being made by the depicted speaker in the frame.

Each image frame coming from the camera local input 134 of end-point 110 may be analyzed for the current locations of the facial landmark points in a reference coordinate frame. For example, normalized image coordinates can be used as a reference frame. Other reference frames can also be used. From these locations of facial landmark points using load balancing procedure determines the position, orientation and scale of the face image in the current multimedia frame, as well as a lower-dimensional representation of the face image obtained by, for example, principal component analysis (PCA). The resulting coefficients from the load balancing procedure may be transmitted to a receiving end-point 110B using network connection 104 to network 105 before, during, or after the multimedia conferencing session of the system 100. If the bandwidth of a network connection 104 of the system 100, for example, is insufficient, the some or all associated multimedia conferencing data may be withheld from being sent to receiving end-point 110B over network connection 104 using load balancing procedure.

In some embodiments, portions of multimedia data including parameters and coefficients received at end-point 110 may be stored in index library 161, 162, for later use. Subsequently, if a set of coefficients or parameters is received at end-point 110 without an accompanying image index of the object, then the received coefficients can be used to search index library 161, 162, for a content index 181, 182, comprising a similar image of the object to be processed to form a replacement for the current multimedia frame in the video transmission. For example, an index library 161, 162, may comprise a list of coefficient arrays and a list of image indexes (content indexes 181, 182). During a search, the distance between the received coefficients and each of the coefficient arrays in the list of image indexes can be computed. An index of the array with the smallest distance from the received coefficients can be identified and the image at that index can be retrieved from the image list for display.

In some embodiments, object landmark points can be extracted from both the received and stored coefficients and used to morph the image of the object so that the image appears more similar to the image of the sender's face captured on end-point 110. If such morphing is not desired according to the load balancing procedure, for example when there is insufficient time or bandwidth, then only the image index may be transferred rather than the coefficients; since system 100 preferably requires that the end-point 110 maintain equivalent index libraries 161, 162, and image content indexes 181, 182, and perform a search for the most similar image to determine the image content indexes 181, 182. When there is insufficient time to send the correction coefficients and/or parameters to be passed from the sending end-point 110A to the receiving end-point 110B, then these may be sent later in another way, for example converted to audio data and appended to the audio data portion of multimedia content and stripped off by the receiving end-point 110B during the otherwise wasted audio skew period. Alternatively these corrections could be sent via broadcast and processed by the receiving end-point 110B at a later time when it has time available, (e.g., during audio skewing time or even late at night as an update to the receiving index library 162 database, long after the multimedia conference has concluded, thus making better starting identical index library 161, 162, databases for the next conference call.)

In some implementations, an end-point 110 may comprise a quality score feedback unit 124 which may determine quality score of the multimedia content of a conferencing session and variable changes the quality score achieved at either or both the sending end-point 110A and receiving end-point 110B using load balancing procedure which may be initiated by an adjustment algorithm that affects each multimedia frame or portions thereof. For example, a face segmentation algorithm can be used to segment the facial content (e.g., mouth, eyes, face outline, etc. of the person speaking) of the multimedia frame from background or other content of the video frame, and transmitting the segmented content during what would be otherwise wasted audio skewing time and/or other facial content, using various networks and/or protocols and/or at later times or not transmitting some content at all. In the latter option, the omitted content may be replaced with a synthetic background content generated at receiving end-point 110B. The quality score feedback unit 124 may be in communication with one or more sensors, such as an output sensor 130, codec sensor 131, and input sensor 132, which may provide the quality score feedback unit 124 with the data required to determine quality score of the multimedia content of a conferencing session and variable changes the quality score achieved at either or both the sending end-point 110A and receiving end-point 110B using load balancing procedure which may be initiated by an adjustment algorithm that affects each multimedia frame or portions thereof. An output sensor 130 may monitor output of local outputs 140. A codec sensor 131 may monitor communication between audio encoder 150 and the channel codec 160. An input sensor 132 may monitor output of local inputs 134.

In some embodiments, the system 100 may enable multiple users 101, via their end-point 110 at separate locations to participate in a group multimedia session while remaining within stringent bandwidth limitations. In this application, each user 101, via their end-point 110 can receive frame indexes and coefficients and parameters from the other participating users 101 in the conference, while the receiving end-point(s) 110B uses otherwise wasted skew time which is customary during audio signal receipt to process sending end-point 110A multimedia data and return processed sending end-point 110B data.

Figure 6:
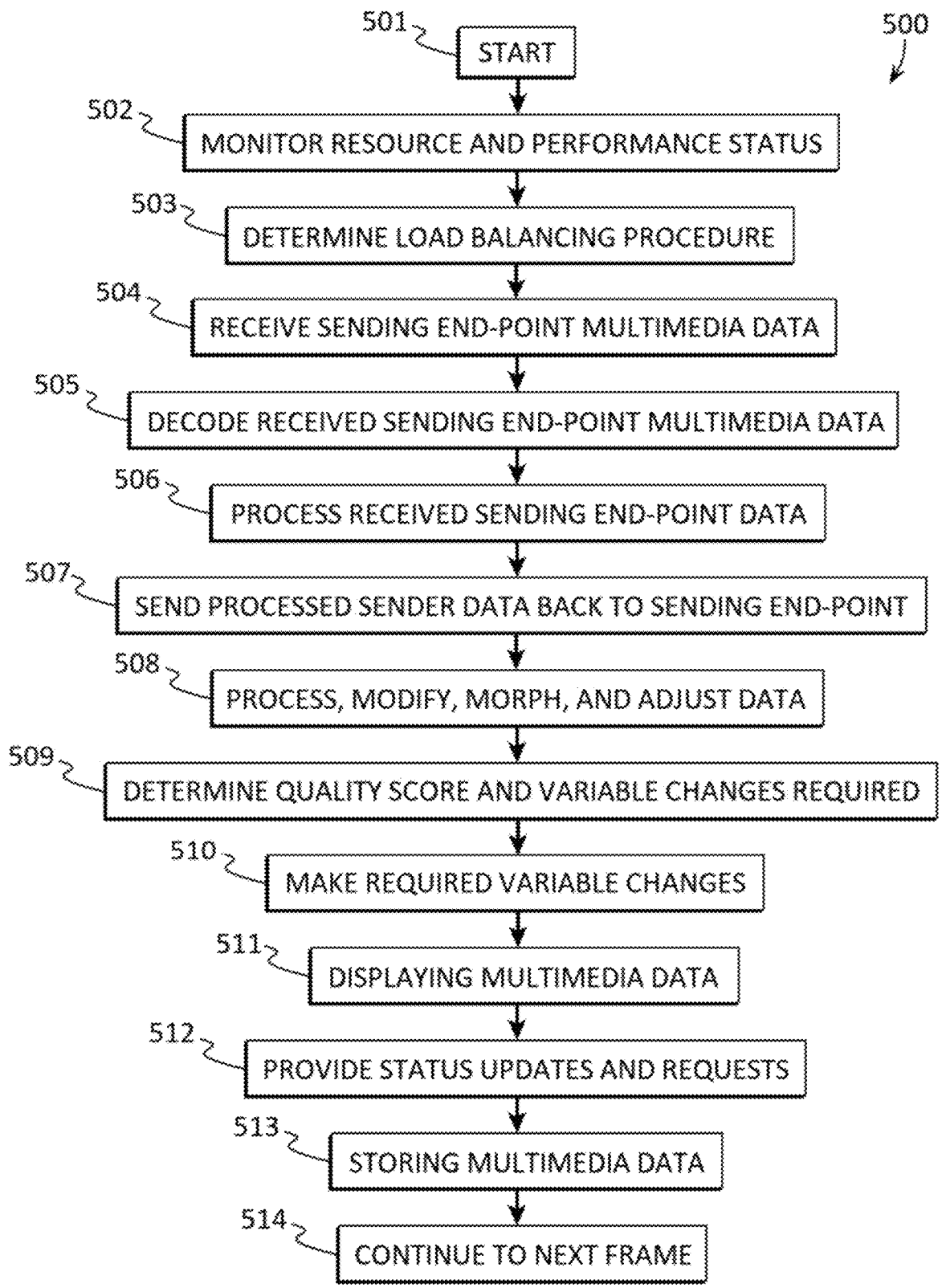
FIG. 6 shows a block diagram illustrating an exemplary load balancing conferencing method for receiving multimedia according to various embodiments described herein.

FIG. 6 illustrates an exemplary Load Balancing conferencing method for receiving multimedia ("the method") 500, such as which may be used in constrained bandwidth networks 105 and which may be performed at a receiving end-point 110B according to various embodiments described herein. One or more steps of the method 500 may be performed using system 100 and its end-points 100 and/or LBMC client devices 700.

In some embodiments, process 500 may start 501 and resource and performance status may be monitored in step 502 preferably via quality score feedback unit 124 and/or resource monitoring instructions 830.

In some embodiments, the method 500 may continue in step 503 by determining load balancing procedure in a load balancing logic and analysis step via load balancer 183.

In some embodiments, the method 500 may continue by the receiving end-point 110B receiving multimedia conferencing data and/or other multimedia session data 179 from sending end-point 110A in step 504 over one or more communications means which could be at various protocols, means, methods and times including during a multimedia conferencing session or at other times when a multimedia session is not in session.

In some embodiments, the method 500 may continue by receiving end-point 110B decoding received sending end-point 110A data in step 505 and local source input data which may include videoconference-related data including any combination of audio data 172 content, such as audio segments, audio signal reference points, timing signals, quantized analog data, phonemes, music, etc. Decoding received sending unit data 505 may include video data, user 101 and session-related data 179, control and reference data such as spatial and timing information, multimedia frame indexes, visemes, complete and/or partial face segments, one or more sets of parameters or coefficients associated with a current multimedia frames or segments of a multimedia transmission from a sending end-point, one or more sets of parameters or coefficients generated from locations of object landmark points characterizing face features as object content and landmark points in the current multimedia frame, accompanying and graphic images and text such as sub-titles or computer data sent as text, session information and data 179 such as sensor data, lighting, geo-location information, security and authorization data, context parameters, instructions, graphics and templates, sensor, timing, location data, system 100 and user 101 control data and multimedia transmission session data and information 179, etc.

In some embodiments, the method 500 may continue by receiving end-point 110B processing some or all of the received face data including a search of its identical receiving index library 162 of receiving multimedia content indexes 182 having previously stored audio, video and background session template transmission data to further implement load balancing by deriving video content from audio data 172 received and sharing some of the sending end-point's 110A overall workload in step 506, thus reducing the workload at the sending end-point 110A in finding the best available viseme and sending the DERIVED MOUTH segment to the sending end-point 110A to use in compositing or at the least to reduce the time the sending end-point 110A would otherwise need to search on its own by itself for the best first video frame portion 174 (TRUE MOUTH).

In some embodiments, the method 500 may continue by receiving end-point 110B transmitting one or more indexes and other data back to the sending end-point 110A, such as best matching background session context template, viseme, and/or derived video segment frame data in step 507. This could be, for example, a background and session template index computed by the receiving end-point 110B during otherwise wasted time while awaiting video data from the sending end-point 110A in which the receiving end-point 110B may provide the sending end-point 110A key session context information, instructions, and accompanying and graphic images and text such as sub-titles or computer data sent as text, session data 179 such as reference data, sensor data, lighting, geo-location information, context parameters, instructions, graphics and templates, sensor, timing, location data, system 100 and user 101 control data, other data, audio and multimedia transmission session information, etc.

Based upon the load balancing condition, the receiving end-point 110B may also send additional information regarding the current multimedia frame and one or more associated sets of coefficients to the sending end-point 110A in step 507. The receiving end-point 110B may continue according to load balancing procedure to receive additional transmitting face data from the sending end-point 110A (step 504) and continue by processing it (step 506) modifying it, including adjusting and transforming it by morphing the image in the retrieved multimedia frame using the received, computed and stored coefficients (step 508). For example, morphing can be performed by generating meshes of landmark points from both the received and stored coefficients, and, given a predetermined triangulation of the mesh, determining the color of each pixel in the morphed image by linearly interpolating within the corresponding triangle in the mesh computed from the stored coefficients.

In some embodiments, the method 500 may continue and a quality score can be computed as a feedback technique to compare the input data and output to ensure the desired quality of the multimedia session is maintained in step 509. Based upon a quality score, a determination can be made by both the transmitting 110A and receiving end-point 110B regarding the best frame to display and making changes to multimedia conferencing variables, such increasing audio skewing time within limits of end-user perception to allow more time to improve effectiveness of the multimedia conferencing experience.

In some embodiments, the method 500 may continue by replacing the current multimedia frame with the best multimedia frame available at the receiving end-point 110B and displaying to user 101 (step 511) providing status updates and requests, such as requests for more or less coefficient and parameter data, requests to slow down, adjust session variables, speed up e.g., change from 30 frames per second to 15 frames per second, re-send some data lost due to network error, etc. (step 512), storing (step 513) and continuing to the next frame (step 514). The method 500 may continue any number of times and any number of steps may be completed and repeated, not necessarily in the order shown in FIG. 6.

Figure 7:
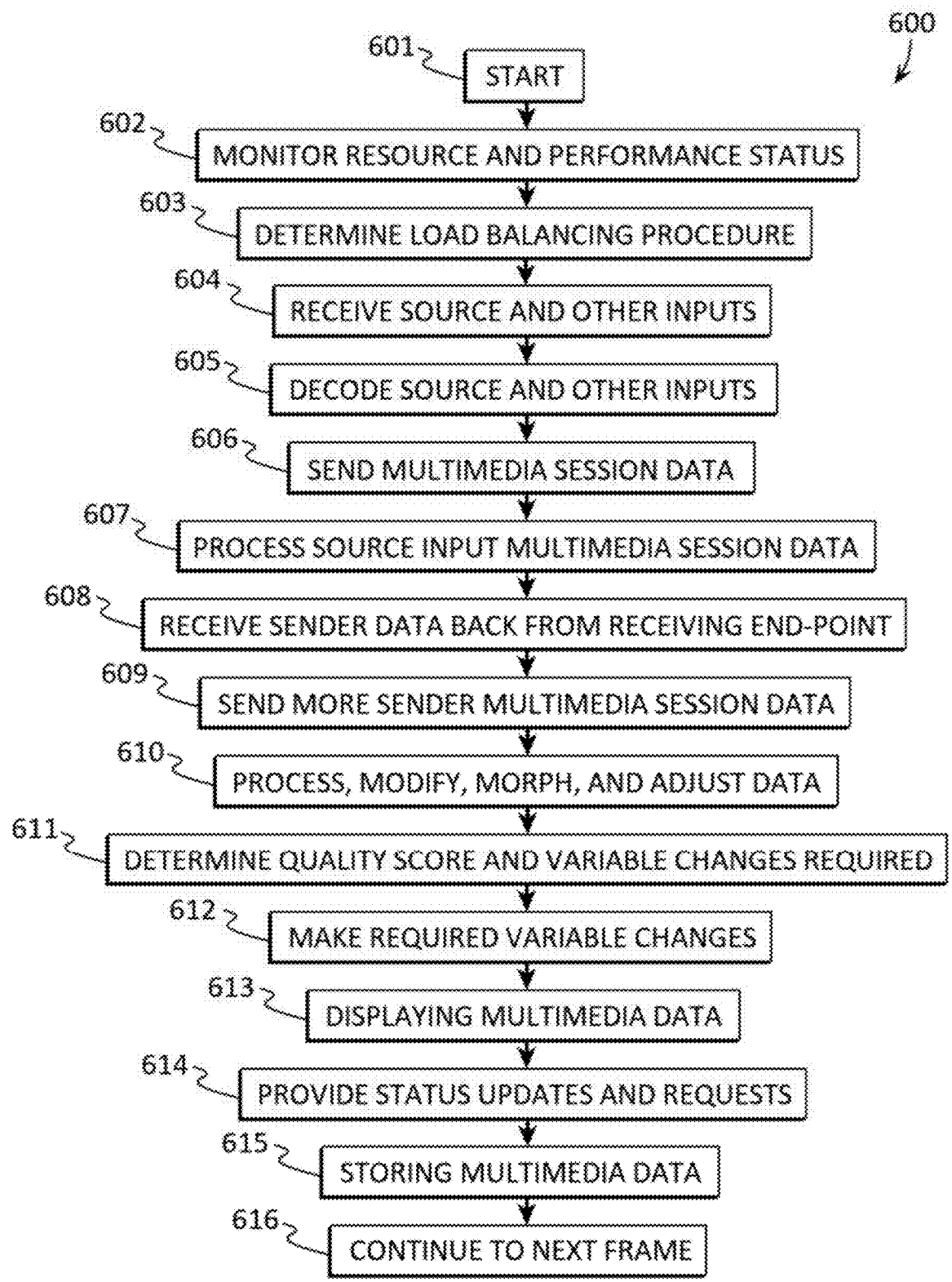
FIG. 7 depicts a block diagram illustrating an exemplary load balancing conferencing method for sending multimedia according to various embodiments described herein.

FIG. 7 depicts an exemplary Load Balancing conferencing method for sending multimedia ("the method") 600, such as which may be used in constrained bandwidth networks 105 and which may be performed at a sending end-point 110A according to various embodiments described herein. One or more steps of the method 600 may be performed using system 100 and its end-points 100 and/or LBMC client devices 700.

In some embodiments, method 600 may start 601 and monitoring resource and performance status may be performed in step 602, preferably via quality score feedback unit 124 and/or resource monitoring instructions 830.

In some embodiments, method 600 may continue by determining a load balancing procedure in a load balancing logic and analysis step 603 via load balancer 183. In this step, the status of key resources such as overall time available, audio skewing time available, communication links and processor(s) performance, quality performance, network 105 and system 100 availability and capacity at sending end-points 110A and receiving end-points 110B may be assessed to determine which end-points and system components will perform which tasks.

In some embodiments, method 600 may continue in step 604 by receiving local source input and/or receiving sending end-point multimedia session data 179 over one or more communications means which could be at various protocols, means, methods and times including during a multimedia conferencing session or at another time when a multimedia session is not in session.

In some embodiments, method 600 may continue by decoding local source input data in step 605 and/or receiving sending end-point 110A multimedia session data 179 which includes any combination of audio signal data content, such as audio segments, audio signal reference points, timing signals (such as modulated analog audio waveforms. etc.), phonemes, etc. and decoding local input data in step 605 including coded video data, user 101 and session-related data 179, control and reference data such as spatial and timing information, multimedia frame indexes, visemes, complete and/or partial face segments, one or more sets of parameters or coefficients associated with a current multimedia frames or segments of a multimedia transmission from a sending end-point 110A, one or more sets of parameters or coefficients generated from locations of object landmark points characterizing face features as object content and landmark points in the current multimedia frame, accompanying and graphic images and text such as sub-titles or computer data sent as text, session data and information 179, such as sensor data, lighting, geo-location information, security and authentication data 180, context parameters, instructions, graphics and templates, sensor, timing, location data, system 100 and user 101 control data and multimedia transmission session data 179, etc.

In some embodiments, method 600 may continue by transmitting audio and session-related video and other data and graphics in real-time to the receiving end-point 110B in step 606 using various communications means and protocols and at various times to enable the receiving end-point 110B to begin its assigned load balancing process tasks and then the sending end-point 110A in step 607 continues by processing some video data at the sending end-point 110A, such as identifying locations of key face feature points corresponding to face features of segments of the transmitting as object landmark points in a current multimedia frame of a multimedia transmission from the sending end-point 110A. In some embodiments, method 600 may by the sending end-point 110A generating coefficients from the object landmark point locations that characterize the key facial object content and landmark points. For example, from the facial landmark point locations of a sender user's 101 face, the position orientation and scale of the sender's 101 face in the current multimedia frame may be determined. These parameters can be further processed in step 607 using techniques such as Principal Component Analysis (PCA) to generate coefficients characterizing the facial content in the current multimedia frame.

In some embodiments, method 600 may continue by the sending end-point 110A searching in step 607 to find a matching multimedia frame which can be determined by comparing the received coefficients with the coefficients of each previously stored multimedia frame in the sending index library 161. The stored multimedia frame having corresponding coefficients that are the most similar to the received coefficients can be retrieved from the sending index library 161. Similarity of two sets of coefficients may be determined by defining a distance function. For example, the distance function can be a weighted sum of the squared differences between each of the coefficients. The weighting of different components in the sum can be used to reflect the relative importance of the different coefficients, and to account for the differing numerical ranges obtained by those coefficients. For example, the scale parameter may take on different values from the orientation parameter or from the PCA coefficients. The stored coefficients with the smallest value for the distance function can be identified as the most similar to the received coefficients.

In some embodiments, method 600 may continue by the sending end-point 110A transmitting real-time audio and data immediately to the receiving end-point 110B in step 606.

In some embodiments, method 600 may continue by the sending end-point 110A processing source input data to calculate a set of coefficients for the current multimedia frame and/or assigned face segments (e.g. eyes, chin, jaw, rest of face, etc.) to send to the receiving end-point 110B in step 606.

In some embodiments, method 600 may continue by the sending end-point 110A receiving back some sending end-point 110A face data (e.g., derived mouth), such as current or future predicted mouth segment and other data received from receiving end-point 110B in step 608 in real-time based upon processing completed by the receiving end-point 110B in the load balancing procedure. These processed sender face data received back from the receiving end-point 110B may be for example a background index and session template index, a sender face mouth segment index and/or a viseme index derived from sender phonemes received earlier in step 606 using load balancing procedure, to exploit otherwise wasted time while awaiting Rest of Face video data from the sending end-point 110A by the receiving end-point 110B (audio skewing time) which could provide the sending end-point 110A with an acceptable mouth segment sooner than it could otherwise derive it on its own, plus depending on remaining time, key session context information, instructions, and accompanying and graphic images and text such as sub-titles or computer data sent as text, session data 179, such as reference data, sensor data, lighting, geo-location information, context parameters, instructions, graphics and templates, sensor, timing, location data, system 100 and user 101 control data, other data, audio and multimedia transmission session data 179, etc.

In some embodiments, method 600 may continue by the sending end-point 110A processing in step 609 transmitting face data received from the receiving end-point 110B (step 609), modifying and adjusting data and/or morphing data (step 610); determining a quality score (step 611); making required variable changes (step 612); displaying the best frame multimedia data (step 613), providing status updates and requests (step 614), storing the data (step 615) and continuing to the next frame (step 616).

Based upon the load balancing condition, the sending end-point 110A may send the best matching retrieved multimedia frame and/or segment index and its associated set of coefficients and parameters and/or an index of the matching frame to the receiving end-point 110B in step 606.

Methods 500 and 600 described above provide an advantage over conventional multimedia conferencing systems by allowing a sending end-point 110A to work with a receiving end-point 110B to use load balancing in constrained bandwidth video networks 105 to send a small amount of data such as an image index or a set of parameters or coefficients associated with a current multimedia frame (small compared to the current multimedia frame) in place of the current multimedia frame, so that the set of parameters or coefficients may be used at the receiving end-point 110B to search a receiving index library 162 of previously stored multimedia frames for similar object content. The multimedia frame with the most similar face content can then be used to process a replacement for the current multimedia frame to provide a smoother display of the video transmission. With load balancing, the receiving end-point 110B can make full use of otherwise wasted communications and processing resources and save time by assisting the sending end-point 110A with processing tasks associated with determining best sending end-point 110A mouth data which in prior art is done at the sending end-point 110A as one of its normal processing tasks. The time savings by using processes 500 and 600 and their inherent load balancing approach, from sharing load among transmitters, receivers, processors, communications means and using different protocols and times can be exploited to adapt multimedia conferencing session and system variables to improve multimedia conferencing to a more life-like experience for participant users 101, especially in constrained bandwidth situations.

Figure 8:
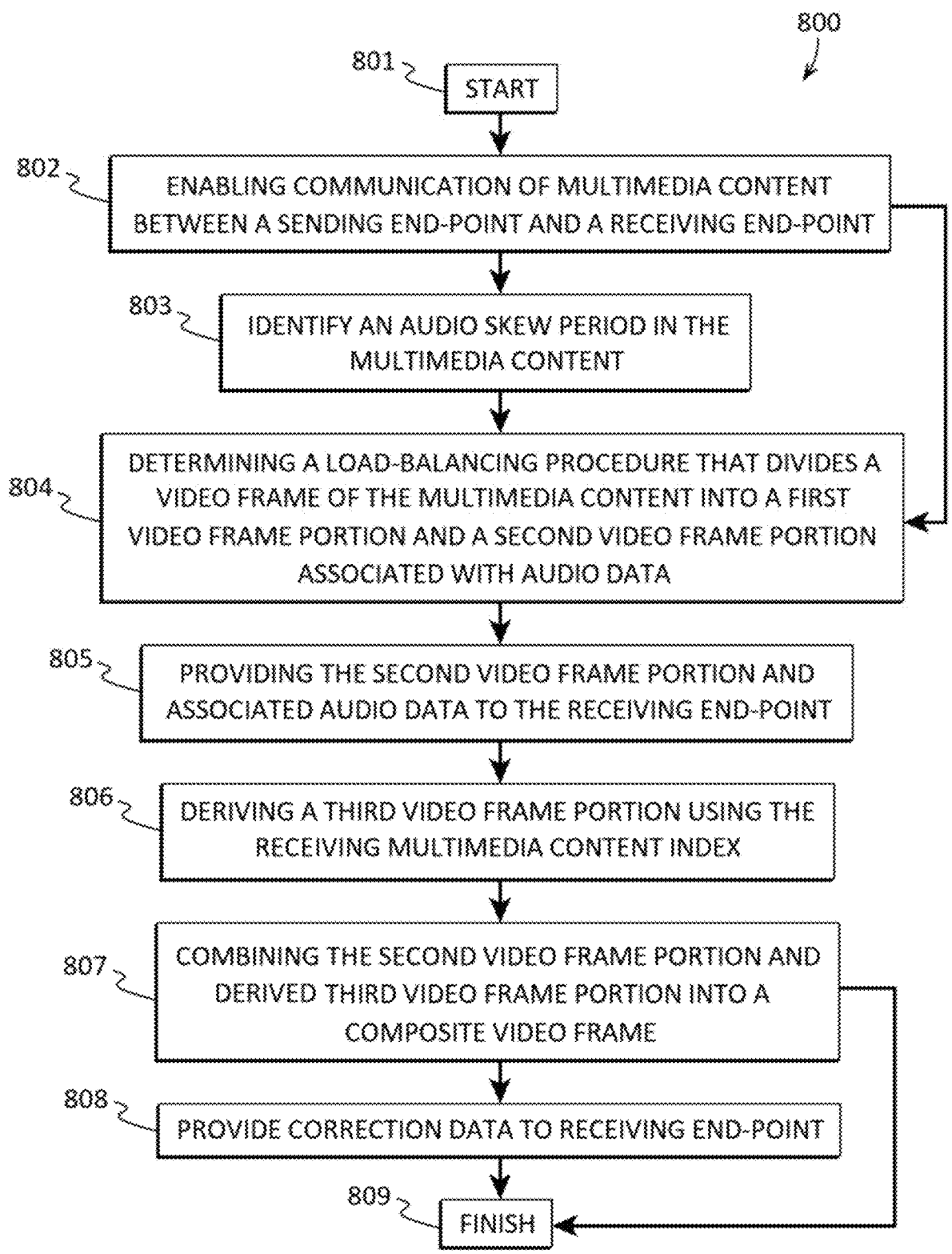
FIG. 8 illustrates a block diagram of an example of a load balancing multimedia conferencing method according to various embodiments described herein.

FIG. 8 shows a block diagram of an example of a load balancing multimedia conferencing method ("the method") 800 according to various embodiments described herein. In some embodiments, the method 800 may be used to provide multimedia content, such as for 2D and 3D video conferencing, using constrained bandwidth networks 105. One or more steps of the method 800 may be performed using system 100 and its end-points 100 and/or LBMC client devices 700, such as I-Phones and Androids, desk top computers, TV sets, or any other electronic devices capable of multimedia conferencing. The method 800 may be used for one-on-one video conferencing or multiple conferee calling with many sender users 101 and receiving users 101 and typically a bridge tying them all together into one session.

In some embodiments, the method 800 may start 801 and communication of multimedia content 171, which may be recorded by a camera subsystem 780 or a video camera type local input 134, may be enabled between a sending end-point 110A and a receiving end-point 110B over a network 105 in step 802. The multimedia content 171 may have audio data 172 that is associated with video frame data 173. For example, the multimedia content 171 may be of a human user 101 speaking so that the audio data 172 may comprise the user's 101 voice and the video frame data 173 may comprise a plurality of 2D or 3D image frames of the user 101 and typically a background. Audio data 172 may also include Alexa speaking, a human, music, voice sounds audio beeps that correspond to a voice print, or any other sounds which may be recorded by a microphone, etc.

In some embodiments, enabling communication of multimedia content 171 between the sending end-point 110A and receiving end-point 110B may require a receiving end-point 110B to provide the sending end-point 110A with authentication data 180. Authentication data 180 includes but is not limited to encryption data, keying data, codes, secret codes, for multi-factor authentication and or block chain data. In some embodiments, the authentication data 180 may be provided to the receiving end-point 110B via a broadcast. Broadcasting is the distribution of audio or video content to a dispersed audience via any electronic mass communications medium, but typically one using the electromagnetic spectrum (radio waves), in a one-to-many model. Broadcast may include multiple simultaneous protocols, formats, communications means, time periods, trickling, bursting, etc. In further embodiments, audio data 172 associated with the multimedia content 171 may include authentication data 180 which may be provided by a broadcast. In further embodiments, enabling communication of multimedia content 171 between the sending end-point 110A and receiving end-point 110B may require the receiving end-point 110B to provide the sending end-point 110A with authentication data 180, and the audio data 172 associated with the second video frame portion 175 may comprise the authentication data 180 which may be in addition to other audio data 172 which may be present, such as session data 179, speakers voices, music, etc.

In preferred embodiments, the sending end-point 110A may comprise or otherwise have access to a sending index library 161 of sending multimedia content indexes 181. In further preferred embodiments, the receiving end-point 110B may comprise or otherwise have access to a receiving index library 162 of receiving multimedia content indexes 182. In still further embodiments, the sending multimedia content indexes 181 and receiving multimedia content indexes 182 are identical, such that the sending multimedia content indexes 181 and receiving multimedia content indexes 182 are substantially identical. In further embodiments, the end-points 110A, 110B, may also have stored synthetic data, training data and previous video portions already stored, or even estimated future/predicted video frame data 173 that is used in forming the composite video frame 177 to cover up defects in stitching process, better smoothing, morphing/transforming a better visual life-like appearance once combined.

In preferred embodiments, a receiving index library 162 may comprise a training database of receiving multimedia content indexes 182 having sender phonemes (derivable from audio data 172 received) that correspond to one or more sender visemes (which are essentially stored video portions) near estimates of the true first video frame portion 174. Best matching viseme (receiving multimedia content index 182) will be selected by receiving end-point 110B to form the basis of deriving third video frame portion 176 in step 807.

In some embodiments, the sending end-point 110A may provide sending multimedia content indexes 181 to the receiving end-point 110B which may be used to populate the receiving index library 162. In further embodiments, the receiving end-point 110B may provide receiving multimedia content indexes 182 to the sending end-point 110A which may be used to populate the sending index library 161. In further embodiments, sending end-point 110A may also need to send small amounts of video portion data to accompany any newly assigned indexes. For example, the sending end-point 110A may require to send better information than a "best match", that is sending end-point 110A may send best match plus small amounts of video portion data such as error correcting vector information or coefficients to improve on best match allowing both sending end-point 110A and receiving end-point 110B to make a new even better identical video frame portion and new identical index number.

In some embodiments, one or more receiving multimedia content indexes 182 of a receiving index library 162 may be provided to one or more receiving end-points 110B via a broadcast and/or sending multimedia content indexes 181 of a sending index library 161 may be provided to one or more sending end-points 110A via a broadcast. Broadcasting is the distribution of audio or video content to a dispersed audience via any electronic mass communications medium, but typically one using the electromagnetic spectrum (radio waves), in a one-to-many model. Broadcast may include multiple simultaneous protocols, formats, communications means, time periods, trickling, bursting, etc. Multimedia conferencing involves multiple layers and protocols and some are serial and some parallel. For example, face image multimedia content indexes of a receiving index library 162 may be updated or populated at night using point to point or multipoint circuit-, packet-switched, or dedicated networks.

In some embodiments, first, second, and/or third video frame portions 176, and preferably combined second and third video frame portions 176 from step 807, may be stored as a sending multimedia content index 181 of a sending index library 161 and/or a receiving multimedia content index 182 of a receiving index library 162.

In some embodiments, the method 800 may comprise optional step 803 in which resource and performance status may be monitored, via quality score feedback unit 124 and resource monitoring instructions 830, to identify an audio skew period in the multimedia content. Generally, an audio skew period may comprise delaying the received audio signal at the receiving end-point 110B until video data is processed and the receiving end-point 110B video data is then aligned with the receiving end-point 110A audio signal, to synchronize multimedia output. In further embodiments, depending upon skewing time of the audio skew period available, sending end-point 110A may use all or perhaps just parts or none of third video frame portion 176 (received from receiving end-point 110B) as a possible time saver to help sending end-point 110A derive best possible first video frame portion 174. In some embodiments, an identified audio skew period may comprise an amount of time that the audio skew period may be elongated to, such as in cases where this elongated audio skew period may have little or no perceptible impact on quality. This may be done by delaying the otherwise immediate transmission of audio data 172 at the sending end-point 110A and inserting a block of session data 179, such as error correction data, authentication data, etc., into the audio data 172. This would give more time for sending 110A and receiving 110B end-points to improve their respective work efforts. This is contrary to prior art. The standards do not envision intentional appending audio data to the front end of the normal audio signal because they are afraid of the impact on end to end delay.

In step 804, a load balancing procedure may be determined, via load balancer 183, that divides a video frame of the multimedia content 171 into a first video frame portion 174 and a second video frame portion 175 having audio data 172 associated with the first video frame portion 174 and the second video frame portion 175. Continuing the above example, a first video frame portion 174 may comprise the mouth of the user 101 and a second video frame portion 175 may comprise the rest of the face/head and background of the user 101. The audio data 172 may comprise the sound or audio recorded when the first and video frame portions where recorded and the first and video frame portions may each be associated with that audio data 172. It should be understood that, there may be more than two video portions in the video frame of the multimedia content 171 and that there may be audio data 172 associated with any of the video frame portions of the multimedia content.

In step 805, the second video frame portion 175 and associated audio data 172 may be provided to the receiving end-point 110B via the network 105. In preferred embodiments, the sending end-point 110A may prioritize sending the audio data 172 associated with first/second video frame portion 175 right away to the receiving end-point 110B, then process and share best possible second video frame portion 175 to the receiving end-point 110B. In further preferred embodiments, sending end-point 110A may strive for highest quality second video frame portion 175.

In step 806, a third video frame portion 176 may be derived by the receiving end-point 110B using a receiving multimedia content index 182 of the receiving index library 162. Preferably, the receiving end-point 110B may prioritize deriving or processing and sharing best possible third video frame portion 176. Generally, the third video frame portion 176 is a best estimate by the receiving end-point 110B where a major component in the best match is the immediate audio data 172 it received that is associated with the first video frame portion 174. In some embodiments, the receiving end-point 110B may derive the third video frame portion 176 by comparing the audio data 172 associated with the first video frame portion 174 to a receiving multimedia content index 182 of the receiving index library 162. Receiving end-point 110B may strive for highest quality derived third video frame portion 176 to combine with received second video frame portion 175 and with other stored data and synthetic material to be used to make stitching compositing more seamless.

In preferred embodiments, the receiving end-point 110B may use otherwise wasted audio skewing time of the audio skew period to derive the virtual/synthetic/best estimate/lifelike third video frame portion 176. Continuing the above example, the receiving end-point 110B may search the receiving index library 162 for a receiving multimedia content index 182 having audio data 172 that substantially matches the audio data 172 associated with the second video frame portion 175 and use the visual data from the receiving multimedia content index 182 to derive the third video frame portion 176 of the user's 101 mouth. While in preferred embodiments, the method 800 may be used for face processing, in other embodiments, the method 800 may be used for any video content, e.g. first video frame portion 174 may be an aerial photo of a farm and second video frame portion 175 may be a diseased blighted area.

In preferred embodiments, the first video frame portion 174 never has to be sent to the receiving end-point 110B. The reason the first video frame portion 174 is not needed is that the receiving end-point 110B derives a surrogate/estimate for the first video frame portion 174 (third video frame portion 176) during that long otherwise wasted audio skewing time at the receiving end-point 110B using just the audio signal received that is associated with the first and second video frame portions 175.

In step 807, the second video frame portion 175 and derived third video frame portion 176 may be combined into a composite video frame 177 by the receiving end-point 110B. Continuing the above example, the third video frame portion 176 comprising the mouth of the user 101 and a second video frame portion 175 comprising the rest of the face/head and background of the user 101 may be combined into a composite video frame 177 having the mouth, face/head, and background of the user 101.

In some embodiments, the method 800 may comprise optional step 808 in which correction data 178 may be provided to the receiving end-point 110B. In preferred embodiments, of step 808, the third video frame portion 176 may be provided to the sending end-point 110A by the receiving end-point 110B, the sending end-point 110A may compare the third video frame portion 176 to the first video frame portion 174 to determine correction data 178, and wherein the sending end-point 110A provides the correction data 178 to the receiving end-point 110B. In some embodiments, since sending end-point 110A unit knows the true difference between first video frame portion 174 and the derived third video frame portion 176, sending end-point 110A may provide feedback error correction to third video frame portion 176 back to receiving end-point 110B when it has time so both index libraries 161, 162, may "learn" to improve for next frame. Receiving end-point 110B, as it has available processing time, may receive quality control error correction data 178 from sending end-point 110A, allowing the receiving end-point 110B to improve future derived third video frame portions 176.

After step 808, the method 800 may continue to the next frame by repeating to step 802 and/or finish 809.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), light emitting diode (LED) display, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random-access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD), light emitting diode (LED) display, or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or WiFi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and Wi-Fi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A load balancing multimedia conferencing method, the method comprising the steps of:
enabling communication of multimedia content, having audio data that is associated with video frame data, between a sending end-point and a receiving end-point, the receiving end-point having a receiving multimedia content index;
determining a load balancing procedure that divides a video frame of the multimedia content into a first video frame portion and a second video frame portion, the first and second video frame portions associated with audio data;
providing the second video frame portion and associated audio data to the receiving end-point;
deriving, via the receiving end-point, a third video frame portion using the receiving multimedia content index; and
combining, via the receiving end-point, the second video frame portion and derived third video frame portion into a composite video frame.

2. The method of claim 1, wherein the receiving end-point derives the third video frame portion by comparing the audio data associated with the first video frame portion to the receiving multimedia content index.

3. The method of claim 1, further comprising the step of providing correction data to the receiving end-point, wherein the third video frame portion is provided to the sending end-point, wherein the sending end-point compares the third video frame portion to the first video frame portion to determine correction data, and wherein the sending end-point provides the correction data to the receiving end-point.

4. The method of claim 1, wherein the sending end-point comprises a sending index library of sending multimedia content indexes, wherein the receiving end-point comprises a receiving index library of receiving multimedia content indexes, and wherein the sending multimedia content indexes and receiving multimedia content indexes are identical.

5. The method of claim 4, wherein the sending end-point provides sending multimedia content indexes to the receiving end-point which are used to populate the receiving index library, and wherein the receiving end-point provides receiving multimedia content indexes to the Sending end-point which are used to populate the sending index library.

6. The method of claim 4, wherein a receiving multimedia content index is provided to the receiving end-point via a broadcast.

7. The method of claim 4, wherein the combined second and third video frame portions are stored as an index selected from the group consisting of a sending multimedia content index and a receiving multimedia content index.

8. The method of claim 1, wherein enabling communication of multimedia content between the sending end-point and receiving end-point requires the receiving end-point to provide the sending end-point with authentication data, and wherein the authentication data is provided to the receiving end-point via a broadcast.

9. The method of claim 1, wherein enabling communication of multimedia content between the sending end-point and receiving end-point requires the receiving end-point to provide the sending end-point with authentication data, and wherein the audio data associated with the second video frame portion comprises the authentication data.

10. The method of claim 1, further comprising the step of monitoring resource and performance status to identify an audio skew period in the multimedia content, and wherein the receiving end-point derives the third video frame portion during the audio skew period.

11. The method of claim 1, further comprising the step of monitoring resource and performance status to identify an audio skew period in the multimedia content, wherein the audio data associated with the first video frame portion comprises authentication data, and wherein the receiving end-point receives the authentication data in the audio data associated with the first video frame portion during the audio skew period.

12. A load balancing multimedia conferencing method, the method comprising the steps of:
enabling communication of multimedia content, having audio data that is associated with video frame data, between a sending end-point and a receiving end-point, wherein the sending end-point comprises a sending index library of sending multimedia content indexes, wherein the receiving end-point comprises a receiving index library of receiving multimedia content indexes, and wherein the sending multimedia content indexes and receiving multimedia content indexes are identical;
determining a load balancing procedure that divides a video frame of the multimedia content into a first video frame portion and a second video frame portion, the first video frame portion associated with audio data;
providing the second video frame portion and associated audio data to the receiving end-point;
monitoring resource and performance status to identify an audio skew period in the multimedia content at the receiving end-point;
deriving, via the receiving end-point, a third video frame portion using the receiving multimedia content index during the audio skew period; and
combining, via the receiving end-point, the second video frame portion and derived third video frame portion into a composite video frame.

13. The method of claim 12, wherein the receiving end-point derives the third video frame portion by comparing the audio data associated with the first video frame portion to the receiving multimedia content index.

14. The method of claim 12, further comprising the step of providing correction data to the receiving end-point, wherein the third video frame portion is provided to the sending end-point, wherein the sending end-point compares the third video frame portion to the first video frame portion to determine correction data, and wherein the sending end-point provides the correction data to the receiving end-point.

15. The method of claim 12, wherein the sending end-point provides sending multimedia content indexes to the receiving end-point which are used to populate the receiving index library, and wherein the receiving end-point provides receiving multimedia content indexes to the sending end-point which are used to populate the sending index library.

16. The method of claim 12, wherein a receiving multimedia content index is provided to the Receiving end-point via a broadcast.

17. The method of claim 12, wherein the combined second and third video frame portions are stored as an index selected from the group consisting of a sending multimedia content index and a receiving multimedia content index.

18. The method of claim 12, wherein enabling communication of multimedia content between the sending end-point and receiving end-point requires the receiving end-point to provide the sending end-point with authentication data, and wherein the authentication data is provided to the receiving end-point via a broadcast.

19. The method of claim 12, wherein enabling communication of multimedia content between the sending end-point and receiving end-point requires the receiving end-point to provide the sending end-point with authentication data, and wherein the audio data associated with the second video frame portion comprises authentication data.

20. The method of claim 12, wherein the audio data associated with the first video frame portion comprises authentication data, and wherein the receiving end-point receives the authentication data in the audio data associated with the first video frame portion during the audio skew period.

* * * * *